(12) United States Patent
Park et al.

(10) Patent No.: US 9,152,225 B2
(45) Date of Patent: Oct. 6, 2015

(54) MOBILE TERMINAL HAVING FLEXIBLE DISPLAY AND CONTROL METHOD FOR THE MOBILE TERMINAL

(71) Applicant: LG ELECTRONICS INC., Seoul (KP)

(72) Inventors: Hyekyung Park, Seoul (KR); Joowoo Lee, Seoul (KR); Hyehyun Kim, Seoul (KR); Sunjung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 203 days.

(21) Appl. No.: 13/900,374

(22) Filed: May 22, 2013

(65) Prior Publication Data

US 2013/0321264 A1  Dec. 5, 2013

(30) Foreign Application Priority Data

Jun. 1, 2012  (KR) .......................... 10-2012-0059406

(51) Int. Cl.
- *G06F 3/01* (2006.01)
- *G06F 1/16* (2006.01)
- *G06F 3/00* (2006.01)
- *G06F 3/041* (2006.01)

(52) U.S. Cl.
CPC ................ *G06F 3/01* (2013.01); *G06F 1/1626* (2013.01); *G06F 3/002* (2013.01); *G06F 3/011* (2013.01); *G06F 3/041* (2013.01)

(58) Field of Classification Search
None
See application file for complete search history.

(56) References Cited

U.S. PATENT DOCUMENTS

| | | | |
|---|---|---|---|
| 2007/0097014 A1 | 5/2007 | Solomon et al. | |
| 2010/0045705 A1* | 2/2010 | Vertegaal et al. | 345/661 |
| 2010/0056223 A1* | 3/2010 | Choi et al. | 455/566 |
| 2010/0060548 A1* | 3/2010 | Choi et al. | 345/1.3 |
| 2010/0120470 A1* | 5/2010 | Kim et al. | 455/566 |
| 2010/0182265 A1* | 7/2010 | Kim et al. | 345/173 |

OTHER PUBLICATIONS

European Patent Office Application Serial No. 13169277.4, Search Report dated Aug. 22, 2013, 6 pages.

\* cited by examiner

*Primary Examiner* — Aneeta Yodichkas
*Assistant Examiner* — Kirk Hermann
(74) *Attorney, Agent, or Firm* — Lee, Hong, Degerman, Kang & Waimey

(57) ABSTRACT

A mobile terminal including a flexible display unit and a related control method are provided. The mobile terminal may include a flexible display unit configured to display first screen information that is flexible in response to an external physical force, a sensing unit configured to sense flexure of the flexible display unit and a controller configured to control the flexible display unit to output second screen information containing information associated with the first screen information on one region of the flexible display unit in response to the flexure.

18 Claims, 32 Drawing Sheets

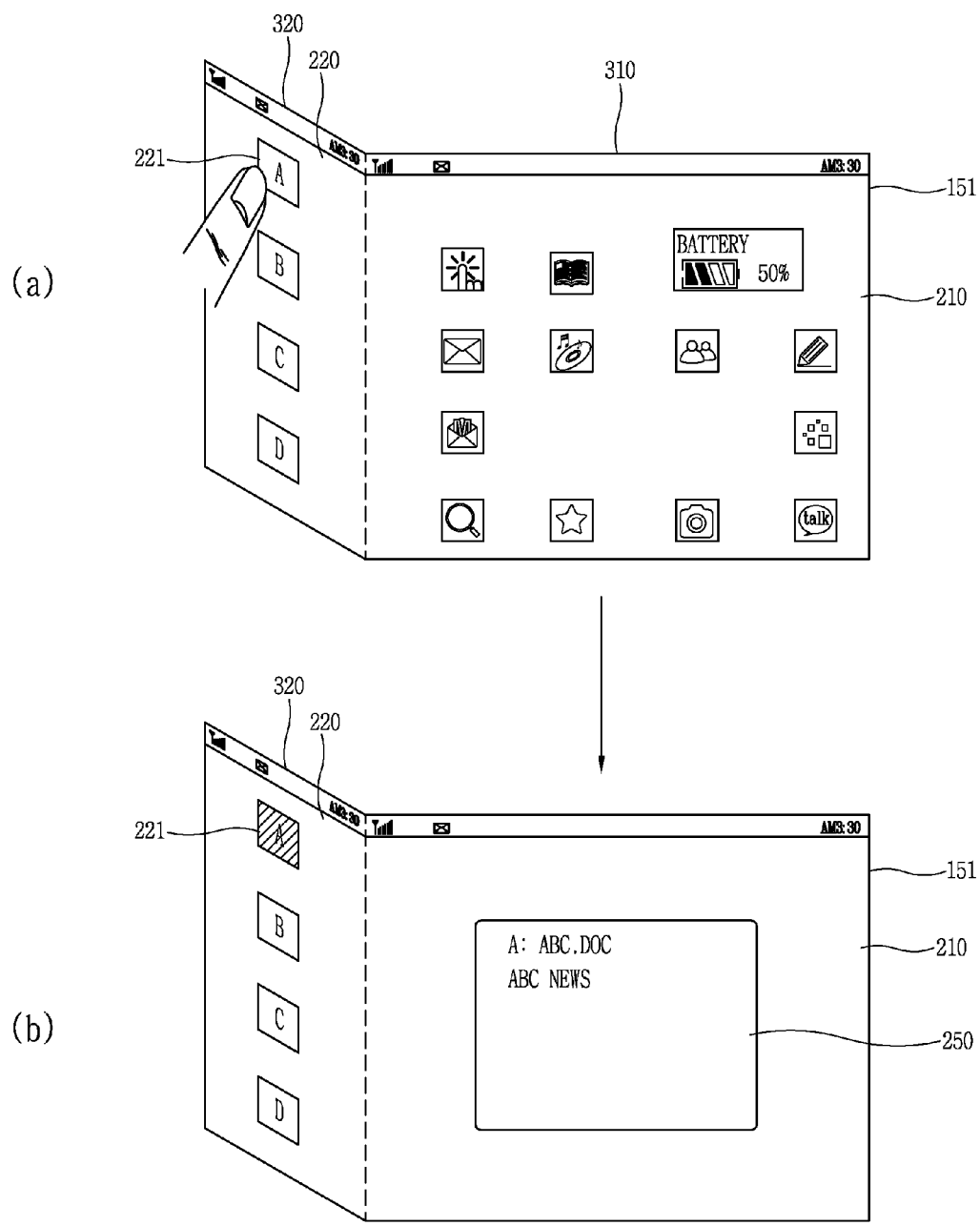

(a)

(b)

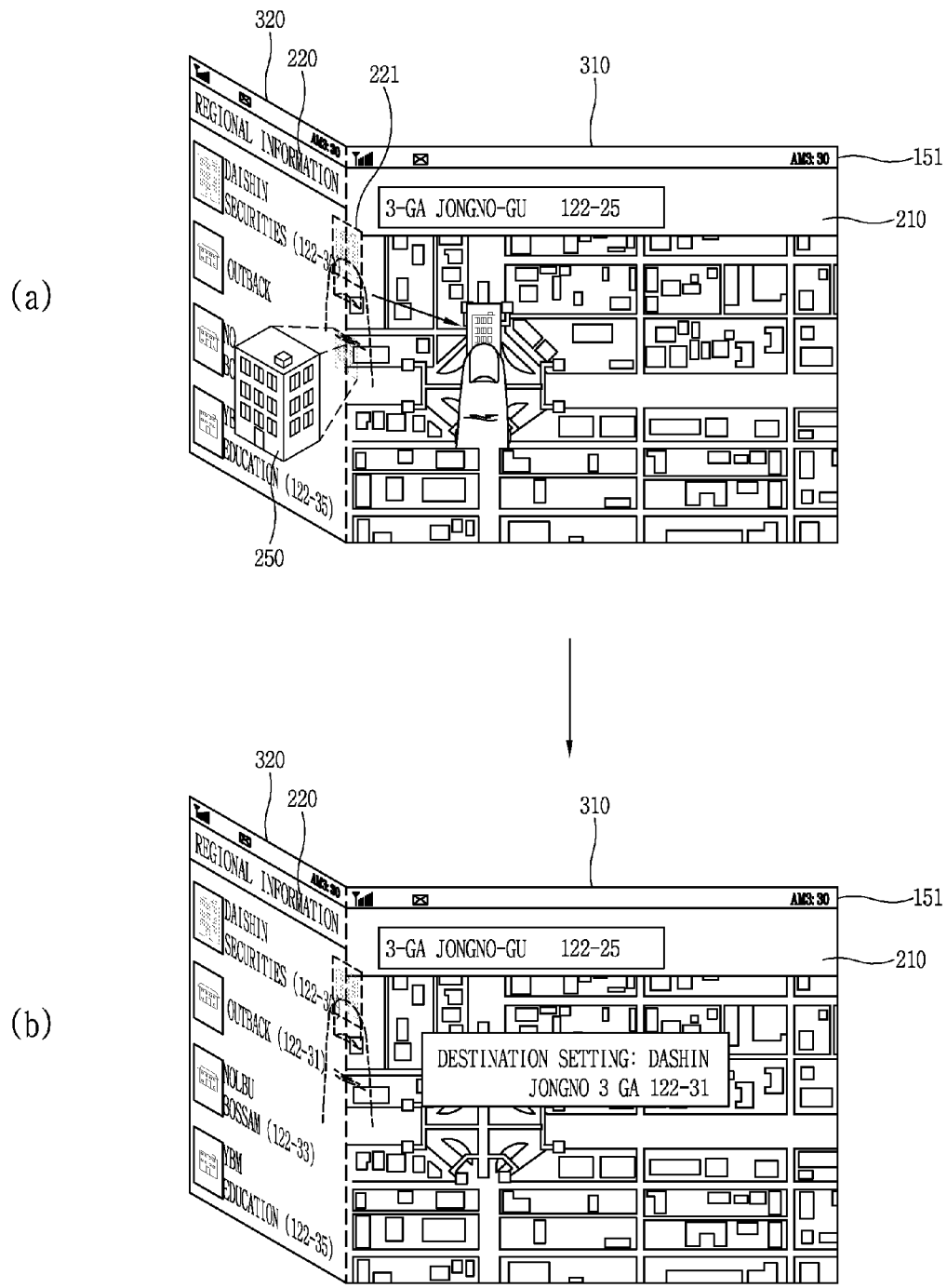

(a)

(b)

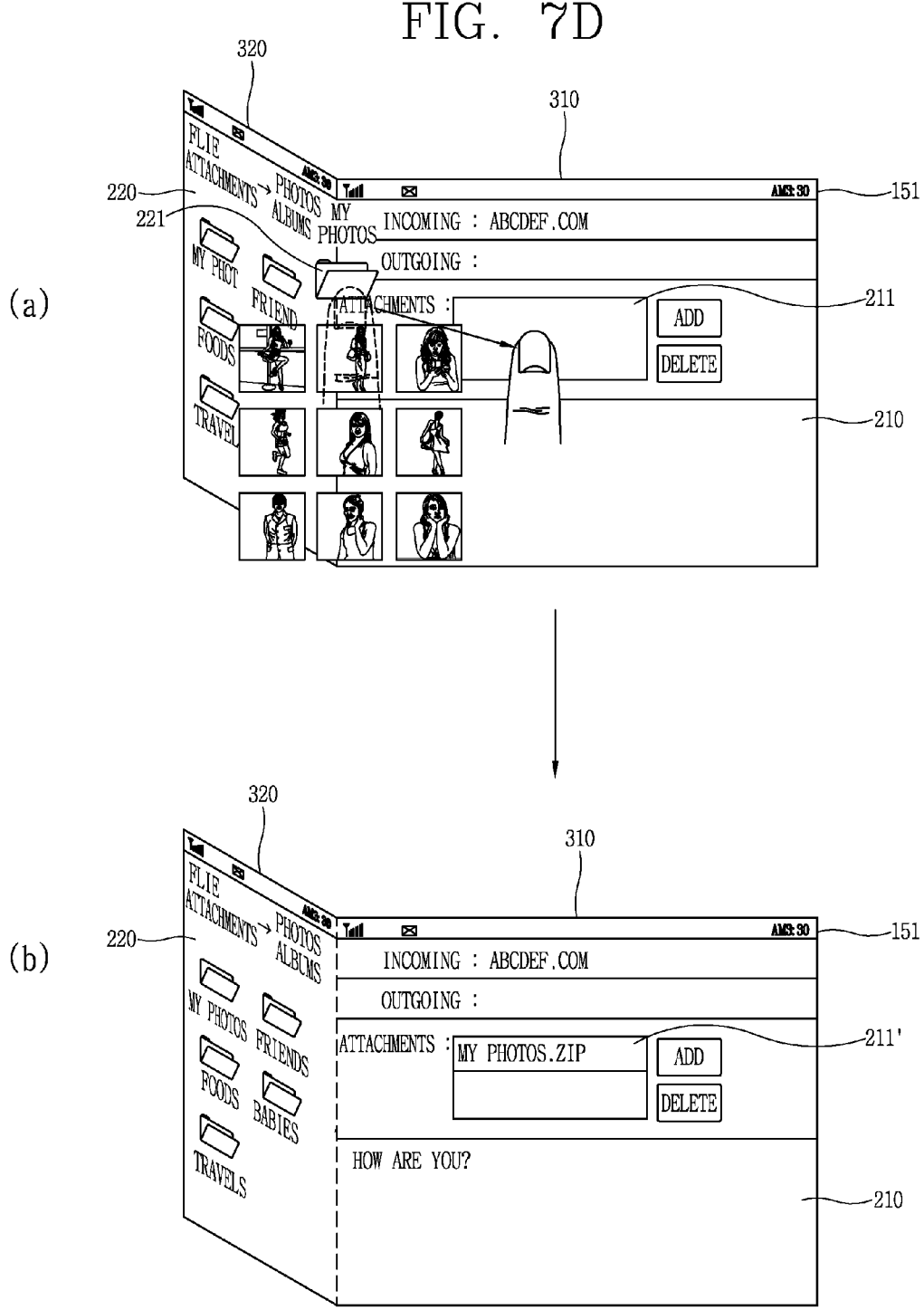

(a)

(b)

MOBILE TERMINAL HAVING FLEXIBLE DISPLAY AND CONTROL METHOD FOR THE MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2012-0059406, filed on Jun. 1, 2012, the contents of which are hereby incorporated by reference herein in their entirety.

BACKGROUND OF THE INVENTION

1. Field of the Invention

The present disclosure relates to a mobile terminal including a flexible display unit and a control method thereof.

2. Discussion of the Related Art

Terminals can be classified into a mobile terminal and a stationary terminal based on its mobility. Furthermore, the mobile terminal can be further classified into a handheld terminal and a vehicle mount terminal based on whether the terminal can be directly carried by a user.

Multifunctional terminals may capture still images or moving images, play music or video files, play games, receive broadcast and perform similar functions, so as to be implemented as an integrated multimedia player. Moreover, improvements of terminals may take into consideration the structure or software to support and enhance the function of the terminals.

In general, terminals have evolved into various types of designs, and accordingly, flexible displays are widely used due to their light and unbreakable characteristics. The flexible displays may create a new user interface area for which their application has been restricted or unattained with existing glass substrate based displays. Furthermore, as the flexible displays are widely used, it may be also required to provide a user friendly user interface based on the characteristics of the flexible displays.

SUMMARY OF THE INVENTION

The object of the present disclosure relates to a mobile terminal and a control method thereof capable of effectively displaying information required for a user based on the characteristics of a flexible display unit that can be bent or curved.

In order to accomplish the foregoing objective, a mobile terminal according to an embodiment of the present disclosure may include a flexible display unit configured to display first screen information and which is flexible in response to a physical force externally, a sensing unit configured to sense a flexure of the flexible display unit, and a controller configured to control the flexible display unit to output second screen information containing information associated with the first screen information on one region of the flexible display unit in response to the flexure.

According to an embodiment, the controller may divide the flexible display unit into a first and a second region based on a location at which the flexure is sensed, and control the flexible display unit to output the first screen information on the first region, and output the second screen information on the second region.

According to an embodiment, the controller may control the flexible display unit to no longer be divided into the first and the second region based on the flexure of the flexible display unit being restored, and display only the first screen information that has been output on the flexible display unit prior to sensing the flexure of the flexible display unit on the flexible display unit.

According to an embodiment, when the first screen information is changed based on a user's touch input to the first region, the controller may change the second screen information such that information corresponding to the changed first screen information is output on the second region.

According to an embodiment, the second screen information displayed on the second region may contain at least one item indicating information associated with the first screen information, and when one of the at least one item is moved to the second region, a visual appearance of the one item may be changed.

According to an embodiment, when the one item is located at a boundary region between the first region and the second region, the controller may output a preview screen on the flexible display unit to allow the user to view at least part of the information corresponding to the one item.

According to an embodiment, the controller may control the flexible display unit such that the preview screen has a three-dimensional depth value other than "0".

According to an embodiment, the controller may control the flexible display unit such that a three-dimensional depth value of the preview screen is changed based on the direction in which the flexure of the flexible display unit is sensed.

According to an embodiment, detailed information corresponding to the any one item may be output on the first region.

According to an embodiment, the flexible display unit may be divided into a first region and a second region based on a location at which the flexure is sensed, the first screen information may be output on the first region, the second screen information may be output on the second region, and a plurality of groups containing information associated with the first screen information may be displayed in the second region, and when at least one of the plurality of groups is moved to a region corresponding to the boundary between the first and the second region, the controller may control the flexible display unit to display at least one item contained in the at least one group.

According to an embodiment, the controller may move at least one item selected from the display of the contents of the at least one group by the user, to the first region.

According to an embodiment, the group may be an image folder containing at least one image, the item may be an image contained in the image folder, and the controller may display at least one image selected by the user on the first region.

According to an embodiment, the flexible display unit may be divided into a first region in which the first screen information is displayed and a second region in correspondence to the flexure, a plurality of items containing information associated with the first screen information may be displayed in the second region, and when one of the plurality of items contained in the second region is selected, a preview screen on which information corresponding to the one item is displayed may be displayed on the first region in which the first screen information is displayed.

According to an embodiment, when a touch input corresponding to a predefined input is applied on the first region, a preview screen corresponding to an item different from the one selected item among the plurality of items instead of the preview screen may be displayed on the flexible display unit.

According to an embodiment, when the flexure of the flexible display unit is removed, the controller may control the flexible display unit to display screen information corresponding to the preview screen on the entire flexible display.

According to an embodiment, the controller may control the flexible display unit to change the amount of the information contained in the second screen information displayed in the second region based on the flexure attribute information of the flexible display unit, and the flexure attribute information may be related to an attribute of the flexure, including a number of flexures, a strength of the flexure, a degree of the flexure, a duration of a flexure, a location of a flexure, or a direction of the flexure of the flexible display unit.

According to an embodiment, the controller may control the flexible display unit such that information having different time information is contained in the second screen information based on a flexure strength of the flexible display unit.

According to an embodiment, when at least one of a plurality of items contained in the second screen information displayed in the second region is moved to the first region in which the first screen information is displayed, the controller may display the one item in highlight mode such that the moved item is distinguished by the user.

According to an embodiment, the controller may control the flexible display unit to change a three-dimensional depth value of the one item, enlarge the one item, or visually display a trace of the one item being moved.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 6A to 6J are conceptual views for explaining a method of displaying associated information based on the flexure of a flexible display unit in a mobile terminal according to an embodiment of the present invention;

FIGS. 7A to 7F are conceptual views for explaining a method of displaying information on a boundary region in a mobile terminal according to an embodiment of the present invention;

DETAILED DESCRIPTION OF THE INVENTION

Figure 1:
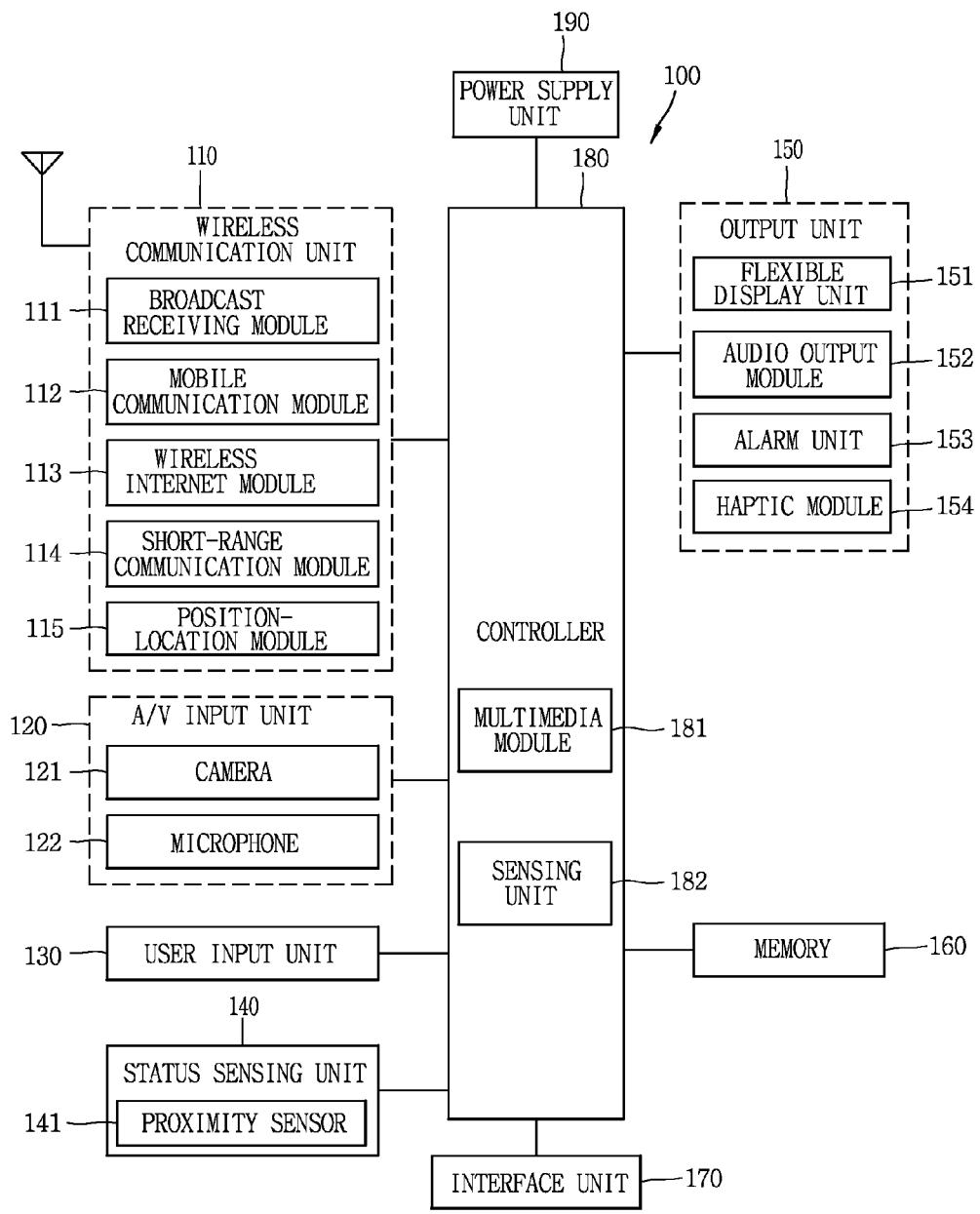
FIG. 1 is a block diagram illustrating a mobile terminal according to an embodiment of the present invention.

The embodiments disclosed herein will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function.

In describing the embodiments disclosed herein the detailed description will be omitted when a specific description for publicly known technologies to which the invention pertains may obscure the gist of the present invention. Also, it should be noted that the accompanying drawings are merely illustrated to easily explain the spirit of the invention, and therefore, they should not be construed to limit the embodiments disclosed herein.

A mobile device disclosed herein may include a portable phone, a smart phone, a laptop computer, a digital broadcast terminal, a personal digital assistant (PDA), a portable multimedia player (PMP), a navigation, and other transportable devices. However, it would be easily understood by those skilled in the art that a configuration according to the following description may be applicable to a stationary terminal such as a digital TV or a desktop computer, excluding constituent elements particularly configured for mobile purposes.

FIG. 1 is a block diagram illustrating a mobile device according to an embodiment of the present invention.

The mobile device 100 may include a wireless communication unit 110, an audio/video (NV) input unit 120, a user input unit 130, a status sensing unit 140, an output unit 150, a memory 160, an interface unit 170, a controller 180, and a power supply unit 190. However, the constituent elements as illustrated in FIG. 1 are not necessarily required, and the mobile device may be implemented with greater or less number of elements than those illustrated in FIG. 1. The constituent elements will be described in sequence.

The wireless communication unit 110 typically includes one or more elements allowing radio communication between the mobile device 100 and a wireless communication system, or allowing radio communication between the mobile device 100 and a network in which the mobile device 100 is located. For example, the wireless communication unit 110 may include a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server through a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits to the mobile device 100. The broadcast signal may include a TV broadcast signal, a radio broadcast signal and a data broadcast signal as well as a broadcast signal in a form that a data broadcast signal is coupled to the TV broadcast signal or radio broadcast signal.

The broadcast associated information may be information related to a broadcast channel, a broadcast program, or a broadcast service provider. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB) or electronic service guide (ESG) of digital video broadcast-handheld (DVB-H).

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), or integrated services digital broadcast-terrestrial (ISDB-T). The broadcast receiving module 111 is configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least a base station, an external terminal or a server over a mobile communication network. The radio signal may include a voice call signal, a video call signal and/or various types of data according to text and/or multimedia message transmission and/or reception.

The mobile communication module 112 may be configured to implement a video communication mode and a voice communication mode. The video communication mode refers to a configuration in which communication is made while viewing an image of a counterpart terminal, and the voice communication mode refers to a configuration in which communication is made without viewing an image of a counterpart terminal. The mobile communication module 112 may be configured to transmit or receive at least voice or image data to implement the video communication mode and voice communication mode.

The wireless Internet module 113 is a module for supporting wireless Internet access. The wireless Internet module 113 may be built-in or externally installed in the mobile device 100. A wireless Internet access technique may be used such as WLAN (Wireless LAN), Wi-Fi, Wibro (Wireless Broadband), Wimax (World Interoperability for Microwave Access), or HSDPA (High Speed Downlink Packet Access).

The short-range communication module 114 is a module for supporting short-range communication. A short-range communication technology may be used including Bluetooth, Radio Frequency IDentification (RFID), Infrared Data Association (IrDA), Ultra WideBand (UWB), and ZigBee.

The location information module 115 is a module for checking or acquiring a location of the mobile device. A representative example of a location information module is a GPS module.

Referring to FIG. 1, the A/V (audio/video) input unit 120 receives an audio or video signal. The A/V (audio/video) input unit 120 may include a camera 121 and a microphone 122.

The camera 121 processes an image frame, such as still picture or video, obtained by an image sensor during a video phone call or an image capturing mode. The processed image frame may be displayed on a flexible display unit 151.

The image frames processed by the camera 121 may be stored in the memory 160 or transmitted to an external device through the wireless communication unit 110. Two or more cameras 121 may be provided according to the use environment of the mobile device.

The microphone 122 receives an external audio signal through a microphone in a phone call mode, a recording mode, or a voice recognition mode. The microphone 122 processes the audio signal into electrical voice data. The processed voice data may be converted and output into a format that is transmittable to a mobile communication base station through the mobile communication module 112 in the phone call mode. The microphone 122 may implement various types of noise canceling algorithms to cancel noise generated while receiving the external audio signal.

The user input unit 130 may generate input data to control an operation of the terminal. The user input unit 130 may be configured by including a keypad, a dome switch, a touch pad (pressure/capacitance), a jog wheel, a jog switch, or other input mechanisms.

The status sensing unit 140 detects a current status of the mobile device 100 such as an opened or closed state of the mobile device 100, a location of the mobile device 100, an orientation of the mobile device 100, and other status states, and generates a sensing signal for controlling the operation of the mobile device 100. For example, when the mobile device 100 is a slide phone, the status sensing unit 140 may sense an opened or closed state of the slide phone. Furthermore, the controller unit 182 takes charge of a sensing function associated with whether power is supplied from the power supply unit 190, or whether an external device is coupled to the interface unit 170. The status sensing unit 140 may include a proximity sensor 141.

The output unit 150 is configured to provide an output of an audio signal, video signal, or an alarm signal, and may include the flexible display unit 151, an audio output module 152, an alarm unit 153, and a haptic module 154.

The flexible display unit 151 may display (output) information processed in the mobile device 100. For example, when the mobile device 100 is in a phone call mode, the flexible display unit 151 may display a User Interface (UI) or a Graphic User Interface (GUI) associated with a call. When the mobile device 100 is in a video call mode or image capturing mode, the flexible display unit 151 may display a captured image and/or received image, a UI or GUI.

The flexible display unit 151 may include at least a Liquid Crystal Display (LCD), a Thin Film Transistor-LCD (TFT-LCD), an Organic Light Emitting Diode (OLED) display, a flexible display, a three-dimensional (3D) display, or an e-ink display.

Some of the displays may be configured as a transparent or optical transparent type to allow viewing of the exterior through the flexible display unit 151, which may be referred to as transparent displays. An example of transparent displays is a transparent LCD (TOLED). With this configuration, a user can view an object positioned at a rear side of a terminal body through a region occupied by the flexible display unit 151 of the terminal body.

Two or more flexible display units 151 may be implemented according to a configured aspect of the mobile device 100. For instance, a plurality of the flexible display units 151 may be arranged on one surface to be spaced apart from or integrated with each other, or may be arranged on different surfaces.

When the flexible display unit 151 and a touch sensitive sensor (hereinafter, referred to as a "touch sensor") have an interlayer structure (hereinafter, referred to as a "touch screen"), the flexible display unit 151 may be used as an input device as well as an output device. The touch sensor may be implemented as a touch film, a touch sheet, a touch pad, and the like.

The touch sensor may be configured to convert changes of a pressure applied to a specific part of the flexible display unit 151, or a capacitance occurring from a specific part of the flexible display unit 151, into electric input signals. Also, the touch sensor may be configured to sense not only a touched position and a touched area, but also a touch pressure.

When there is a touch input to the touch sensor, the corresponding signals are transmitted to a touch controller (not shown). The touch controller processes the received signals, and then transmits corresponding data to the controller 180. Accordingly, the controller 180 may sense which region of the flexible display unit 151 has been touched.

Referring to FIG. 1, a proximity sensor 141 may be arranged at an inner region of the mobile device 100 covered by the touch screen, or near the touch screen. The proximity sensor may sense presence or absence of an object approaching a surface to be sensed, or an object disposed near a surface to be sensed, by using an electromagnetic field or infrared rays without a mechanical contact. The proximity sensor has a longer lifespan and more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, or other types of sensors. When the touch screen is implemented as a capacitance type, proximity of a pointer to the touch screen is sensed by changes of an electromagnetic field. In this case, the touch screen (touch sensor) may be categorized as a proximity sensor 141.

Hereinafter, for the sake of convenience, a status that the pointer is positioned to be proximate to the touch screen without contact will be referred to as a 'proximity touch', whereas a status that the pointer substantially comes in contact with the touch screen will be referred to as a 'contact touch'. The position corresponding to the proximity touch of the pointer on the touch screen is a position where the pointer faces perpendicular to the touch screen upon the proximity touch of the pointer.

The proximity sensor 141 senses proximity touch and proximity touch patterns (e.g., distance, direction, speed, time, position, moving status.). Information relating to the sensed proximity touch and the sensed proximity touch patterns may be output to the touch screen.

The audio output module 152 may output audio data received from the wireless communication unit 110 or stored in the memory 160 during a call-receiving mode, a call-placing mode, a recording mode, a voice recognition mode, a broadcast reception mode, or other terminal modes. The audio output module 152 may output audio signals relating to functions performed in the mobile device 100, e.g., sound alarming a call received or a message received. The audio output module 152 may include a receiver, a speaker, a buzzer, or other audio output mechanisms.

The alarm unit 153 outputs signals notifying the occurrence of events from the mobile device 100. The events may include a call received, message received, key signal input, touch input, and other mobile device events. The alarm unit 153 may output not only video or audio signals, but also other types of signals such as signals notifying occurrence of events in a vibration manner. Since the video or audio signals can be output through the flexible display unit 151 or the audio output unit 152, the flexible display unit 151 and the audio output unit 152 may be categorized as a part of the alarm unit 153.

The haptic module 154 generates various tactile effects which a user can feel. A representative example of the tactile effects generated by the haptic module 154 includes vibration. Vibration generated by the haptic module 154 may have a controllable intensity and a controllable pattern. For instance, different vibration may be output in a synthesized manner or in a sequential manner.

The haptic module 154 may generate various tactile effects, including not only vibration, but also arrangement of pins vertically moving with respect to a skin being touched, an air injection force or an air suction force through an injection hole or a suction hole, touch by a skin surface, presence or absence of contact with an electrode, effects by stimulus such as an electrostatic force, reproduction of cold or hot feeling using a heat absorbing device or a heat emitting device, and other physical tactile effects.

The haptic module 154 may be configured to transmit tactile effects through direct contact with a user, or a user's muscular sense using a finger or a hand. Two or more haptic modules 154 may be implemented according to the configuration of the mobile device 100.

The memory 160 may store a program for processing and controlling the controller 180. Alternatively, the memory 160 may temporarily store input/output data (e.g., phonebook data, messages, audios, still images, and videos). The memory 160 may also store data related to various patterns of vibrations and sounds output upon the touch input on the touch screen.

The memory 160 may be implemented using any type of suitable storage medium including flash memory, a hard disk, a micro multimedia card, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and other suitable memory medium. The mobile device 100 may also operate using web storage which performs the storage function of the memory 160 via the Internet.

The interface unit 170 may generally be implemented to interface the mobile device with external devices. The interface unit 170 may allow data reception from an external device, power delivery to each component in the mobile device 100, or data transmission from the mobile device 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, and earphone ports.

The identification module (not pictured) may be configured as a chip for storing various information required to authenticate an authority to use the mobile device 100. The identification module may include a User Identity Module (UIM), a Subscriber Identity Module (SIM), or other identity modules. Also, the device having the identification module (hereinafter, referred to as 'identification device') may be implemented in a type of smart card. Hence, the identification device can be coupled to the mobile device 100 via a port.

The interface unit 170 may serve as a path for power to be supplied from an external cradle to the mobile device 100 when the mobile device 100 is connected to the external cradle or as a path for transferring various command signals input from the cradle by a user to the mobile device 100. Such various command signals or power input from the cradle may operate as signals for recognizing that the mobile device has accurately been mounted to the cradle.

The controller 180 typically controls the overall operations of the mobile device 100. For example, the controller 180 performs the control and processing associated with telephony calls, data communications, and video calls. The controller 180 may include a multimedia module 181 for reproducing multimedia data. The multimedia module 181 may be implemented in an integrated manner within the controller 180 or may be implemented in a separate manner from the controller 180.

Furthermore, the controller 180 can perform a pattern recognition processing so as to recognize writing or drawing input on the touch screen as text or image.

Furthermore, when the status of the mobile terminal satisfies a preset condition, the controller 180 may implement a lock state for restricting the user's control command input to applications. Furthermore, the controller 180 may control a lock screen displayed in the lock state based on a touch input sensed through the flexible display unit (hereinafter, referred to as a "touch screen") 151 in the lock state.

The power supply unit 190 receives external power and internal power under the control of the controller 180 to provide power required by various components.

Various embodiments described herein may be implemented in a medium that can be read by a computer or similar device using software, hardware, or any combination thereof.

For hardware implementation, it may be implemented by using at least application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electrical units designed to perform the functions described herein. In some cases, such embodiments may be implemented in the controller 180 itself.

For software implementation, the embodiments such as procedures or functions may be implemented together with separate software modules. The software modules may perform at least one function or operation described herein.

Software codes can be implemented by a software application written in any suitable programming language. The software codes may be stored in the memory 160 and executed by the controller 180.

Figure 2A:
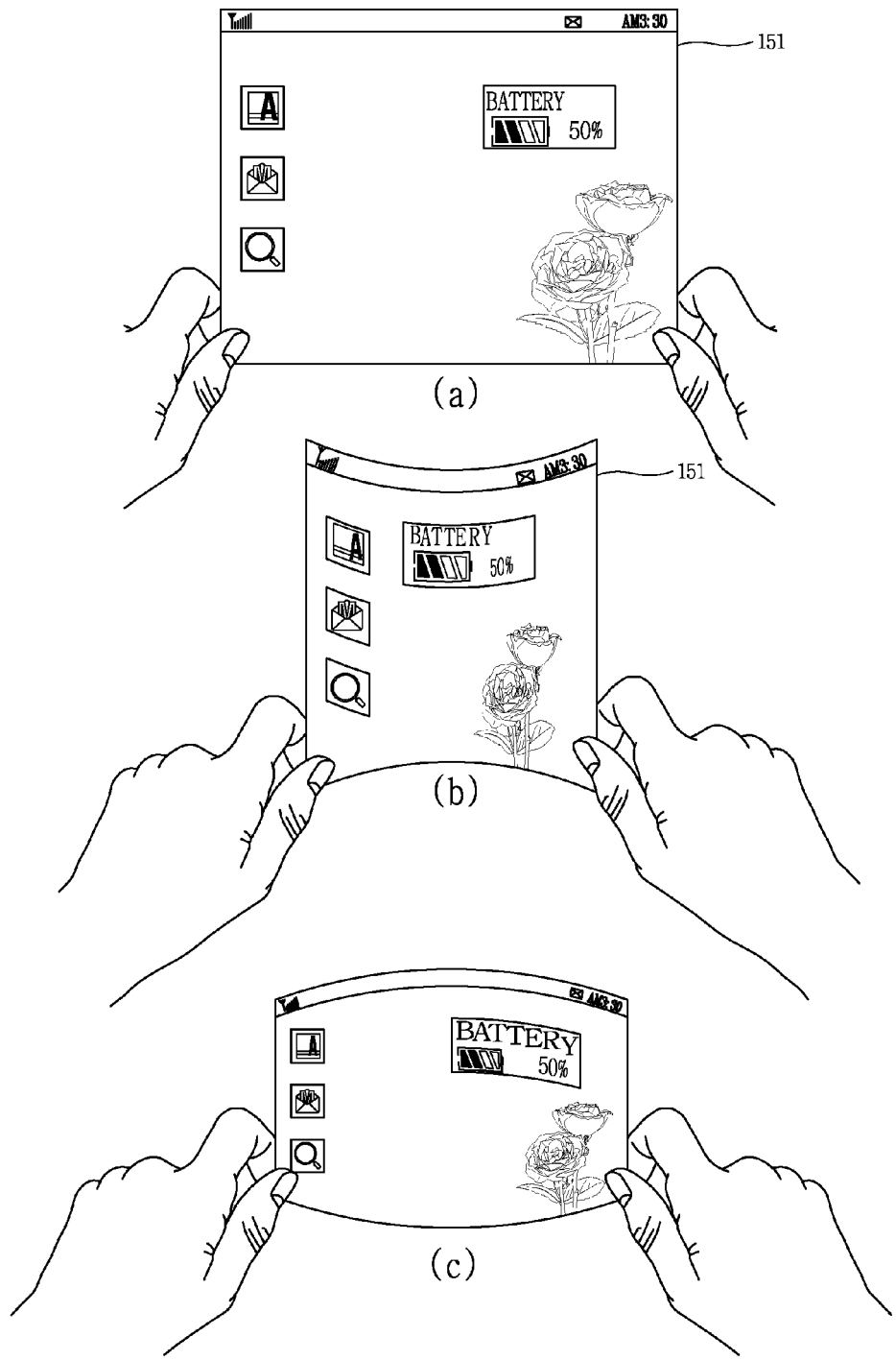
FIGS. 2A and 2B are conceptual views for explaining a flexible display unit included in a mobile terminal according to an embodiment of the present invention.
Figure 2B:
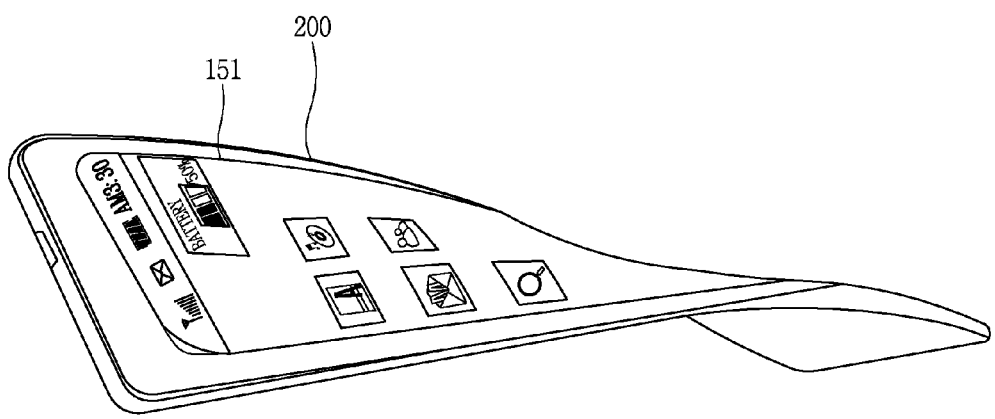

According to the present disclosure, information processed in the mobile terminal 100 may be displayed using a flexible display unit 151. Hereinafter, a flexible display unit 151 will be described in more detail along with the accompanying drawings. FIGS. 2A and 2B are conceptual views for explaining a flexible display unit 151 included in a mobile terminal according to an embodiment of the present invention.

As illustrated in FIGS. 2A and 2B, the flexible display unit 151 may include a flexible display that can be bent, curved, folded, or rolled by a physical force applied externally. Here, the flexible display unit may include both a typical flexible display and electronic paper.

Here, the typical flexible display refers to a light, non-fragile and solid display fabricated on a thin and flexible substrate that can be bent, curved, folded, or rolled while maintaining the existing display characteristics of a flat panel display.

The electronic paper may be different from a typical flat panel display by using reflected light as a display technology to which the characteristics of typical ink are applied. The electronic paper may change a drawing or text using electrophoresis with twist balls or capsules.

The sensing unit 182 (referring to FIG. 1) may sense the flexure information of the flexible display unit 151. The word "flexure" in the present disclosure may include all the meanings of being curved, rolled, folded, and bent.

The sensing unit 182 may be disposed as a whole or partly on the flexible display unit 151 to sense the flexure information of the flexible display unit 151. The flexure information of the flexible display unit 151 may include a bent direction, a bent amount, a bent location, a bent time, an acceleration at which the bent flexible display unit 151 is restored to an original state, and various other information sensed due to a flexure of the flexible display unit 151.

Furthermore, the controller 180 may change information displayed by the flexible display unit 151 or generate a control signal for controlling the function of the mobile terminal based on the flexure information of the flexible display unit 151 sensed by the sensing unit 182.

For example, as illustrated in FIGS. 2A and 2B, when the flexible display unit 151 is bent in response to an external physical force, the controller 180 may rearrange, divide, or combine screen images that were previously displayed on the flexible display unit 151, or change a curvature of the screen images based on a bent direction of the flexible display unit 151, a bent angle of the flexible display unit 151, or an acceleration speed at which the bent flexible display unit 151 is restored to an original state.

As an example, as illustrated in FIG. 2A(b), when the flexible display unit 151 is bent in an inward direction by an external force, screen images displayed on the flexible display unit 151 may be displayed to be close to each other. On the contrary, as illustrated in FIG. 2A(c), when the flexible display unit 151 is bent in an outward direction by an external force, screen images displayed on the flexible display unit 151 may be displayed to be separated from each other.

Furthermore, in addition to the foregoing methods, the controller 180 may control a method of displaying information on the flexible display unit 151 in various ways to allow the user to correctly recognize information displayed on the flexible display unit 151 in response to the flexure of the flexible display unit.

On the other hand, the mobile terminal according to the present invention including the flexible display unit 151 may include a case 200 surrounding the flexible display unit 151 as illustrated in FIG. 2B. Furthermore, the case 200 may be implemented to be bent together with the flexible display unit 151 by an external physical force in consideration of the characteristics of the flexible display unit 151.

On the other hand, as described above, the controller 180 may generate a control signal associated with the function of the mobile terminal in response to the flexure information of the flexible display unit 151.

Hereinafter, a method of controlling the mobile terminal during a time in which the flexure of the flexible display unit is maintained will be described in more detail.

Figure 3:
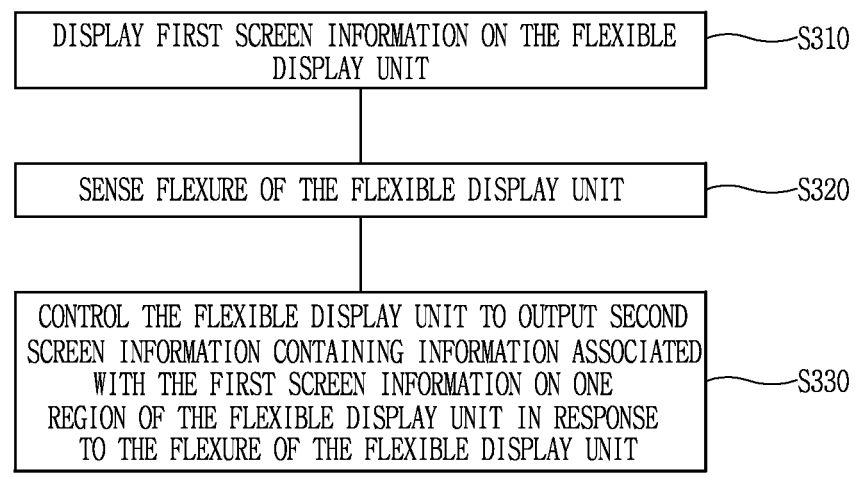
FIG. 3 is a flow chart for explaining a method of displaying information on a flexible display unit in a mobile terminal according to an embodiment of the present invention.
Figure 4A:
FIGS. 4A to 4C are conceptual views illustrating the method illustrated in FIG. 3.
Figure 4B:
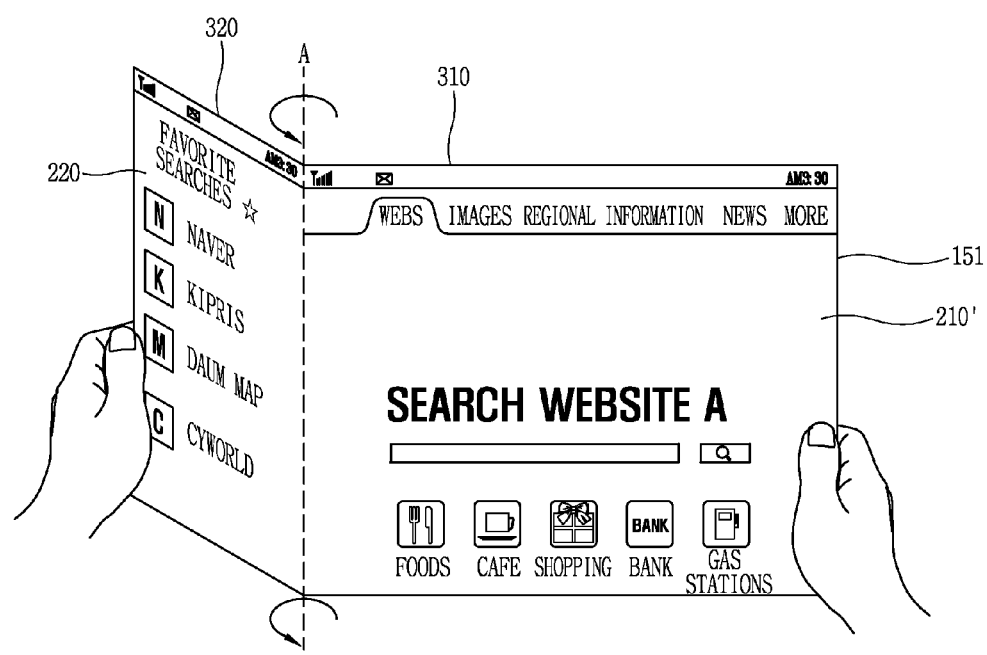
Figure 4C:
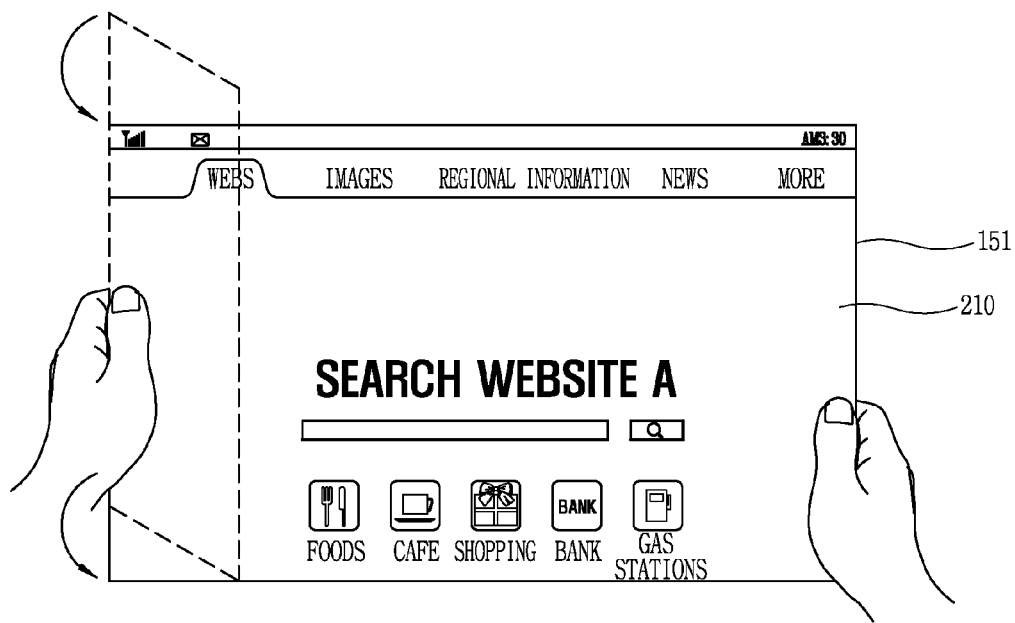

FIG. 3 is a flow chart for explaining a method of displaying information on a flexible display unit in a mobile terminal according to an embodiment of the present invention, and FIGS. 4A, 4B and 4C are conceptual views illustrating a control method according to FIG. 3.

In a mobile terminal according to the present disclosure, the controller 180 (referring to FIG. 1) displays first screen information on the flexible display unit 151 (S310). Here, the first screen information displayed on the flexible display unit 151 may be an execution screen, a web page execution screen, a home screen or a menu screen of an application. Furthermore, the first screen information may be configured with at least a text, an image (containing an icon), a flash or a video.

When one region of the flexible display unit 151 is bent as a physical force is applied to the flexible display unit 151 the sensing unit 182 senses the flexure of the flexible display unit 151 (S320).

The flexure is caused by an external physical force being applied to the flexible display unit 151, and the external physical force may be applied by a user or another object other than the user.

The controller 180 may control the sensing unit 182 to sense the flexure of the flexible display unit 151 while the first screen information is displayed on the flexible display unit 151. The controller 180 may control the sensing unit 182 to sense the flexure at any place, region, location of the flexible display unit 151. Furthermore, the controller 180 may control the sensing unit 182 to sense whether a preset specific region or specific location on the flexible display unit 151 is bent, or whether the flexible display unit 151 is bent in a specific direction.

When the flexure of the flexible display unit 151 is sensed, the controller 180 controls the flexible display unit 151 to display second screen information containing information associated with the first screen information displayed on the flexible display unit 151 in response to the detected flexure (S330).

For example, as illustrated in FIGS. 4A and 4B, when the flexible display unit 151 is bent about a virtual reference axis (A) while the first screen information 210 corresponding to a web site is displayed on the flexible display unit 151, the controller 180 may receive a control signal for the flexure of the flexible display unit 151 from the sensing unit 182.

Furthermore, the controller 180 may control the flexible display unit 151 to display second screen information 220 on a region 320 divided by a virtual reference axis (A) in response to the flexure of the flexible display unit 151, where the second screen information 220 contains information associated with the first screen information 210, as illustrated in FIG. 4B.

The second screen information 220 containing information associated with the first screen information 210 may be an execution screen, a web page execution screen or a search result display screen of the application. Furthermore, the second screen information may be configured with at least a text, an image (containing an icon), a flash or a video.

The second screen information 220 is information associated with the first screen information. For example, when a web page screen is displayed on the first screen information as illustrated in FIG. 4B, the second screen information may include favorite search items or URL addresses corresponding to web pages other than the web page in the first screen information.

As illustrated in FIG. 4B, the controller 180 may divide the flexible display unit 151 into a first region 310 and a second region 320 according to a location (for example, a virtual reference axis (A) at which the flexure of the flexible display unit is sensed).

Furthermore, the controller 180 may control the flexible display unit 151 to display the first screen information 210 on the first region 310 and display the second screen information 220 on the second region 320.

When the flexible display unit 151 is displaying first screen information 210 (as illustrated in FIG. 4A) and a flexure is sensed such that the flexible display unit 151 is divided into a first region 310 and a second region, 320, the controller may change a display size of the first screen information 210 such that the first screen information 210 is still displayed in the reduced region (as illustrated in FIG. 4B).

When the flexure of the flexible display unit 151 is no longer sensed as illustrated in FIG. 4C, the controller 180 may control the flexible display unit 151 to no longer divide the flexible display unit into the first region 310 and second region 320 and terminate the display of the second screen information 220.

In other words, the controller 180 may terminate the dividing of the flexible display unit 151 into the first 310 and the second 320 regions based on the flexure of the flexible display unit 151 being restored. Furthermore, the controller 180 controls the flexible display unit 151 to display only the first screen information 210 that was displayed on the flexible display unit prior to sensing the flexure of the flexible display unit 151, as illustrated in FIG. 4C.

Furthermore, it may only be when a preset specific region, for example, a left edge region 210 is bent as illustrated in FIG. 4B, that the controller 180 may control the flexible display unit 151 to display second screen information 220, such as at least one function icon. Here, the location of a preset specific region may be changed in various ways to any location on the flexible display unit 151 according to the user's selection.

As described previously, a mobile terminal according to the present invention may generate a control signal for outputting information associated with information displayed on the flexible display unit 151 according to the flexure of the flexible display unit 151. Accordingly, the user may not need to directly touch the flexible display unit to output the associated information.

Furthermore, according to the present invention, a control signal for performing a function associated with information displayed on the flexible display unit 151 may be generated based on a preset region being bent, thereby preventing the performance of an unintended function generated by a user's unintentional flexure of the flexible display unit 151.

Figure 5A:
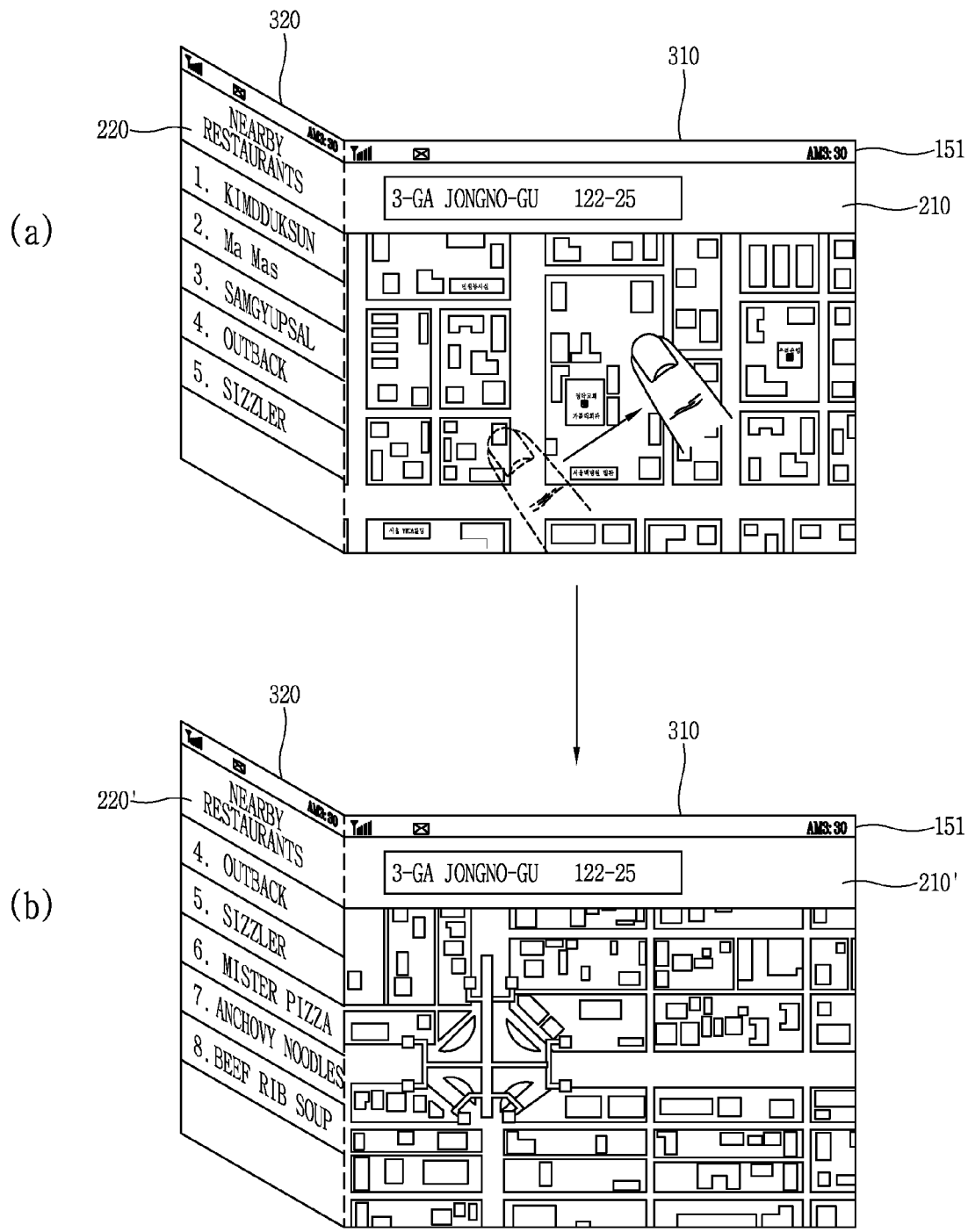
FIGS. 5A and 5B are conceptual views illustrating a method of changing displayed information in a mobile terminal according to an embodiment of the present invention.
Figure 5B:
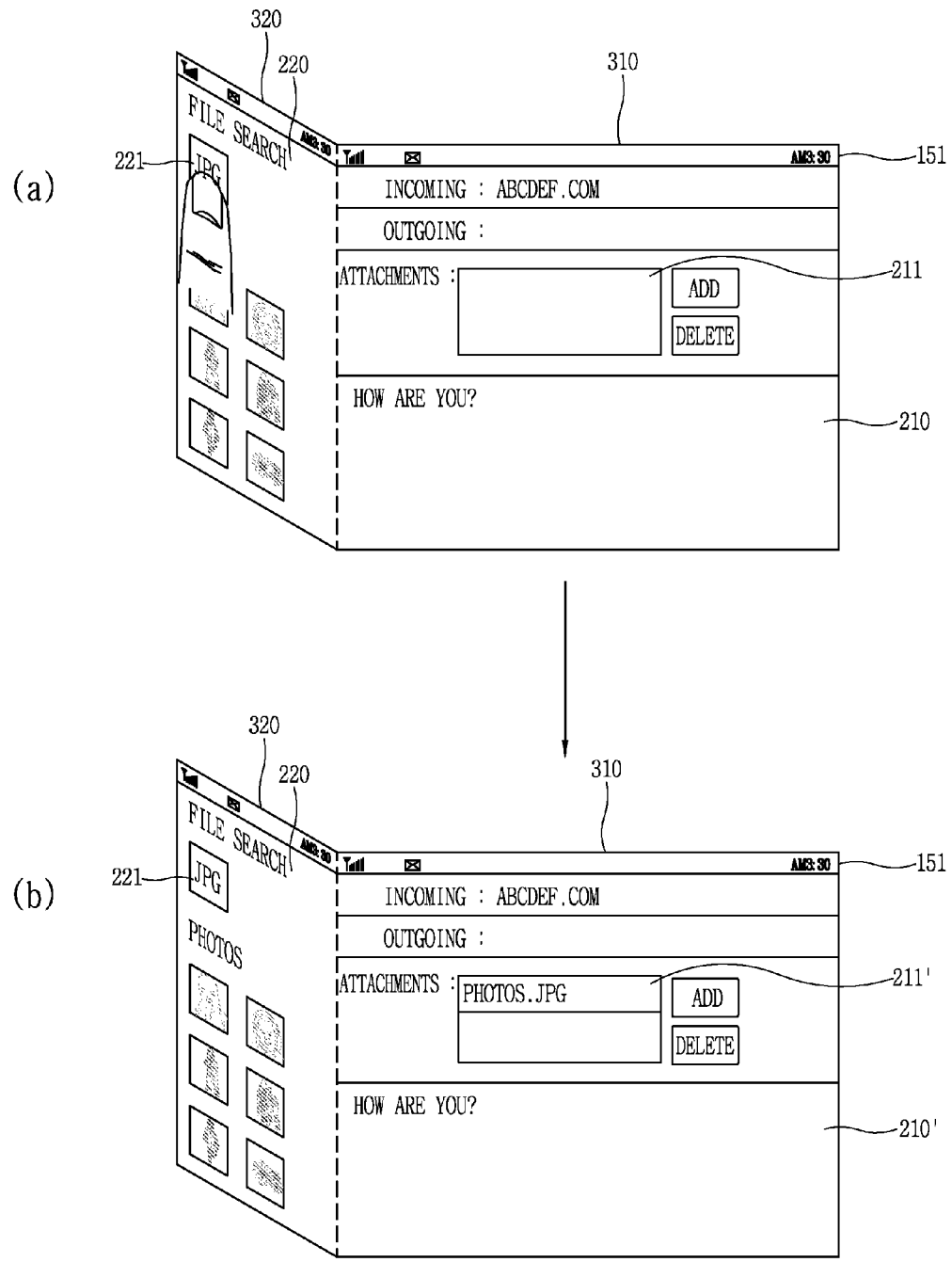

Hereinafter, a method of changing the first and second screen information using a touch input to the flexible display unit 151 will be described in more detail along with the accompanying drawings. FIGS. 5A and 5B are conceptual views illustrating a method of changing displayed information in a mobile terminal according to an embodiment of the present invention.

Previously, a method of dividing the flexible display unit into first 310 and second 320 regions according to a flexure of the flexible display unit 151, and outputting first screen information 210 and second screen information 220 in each region was described with reference to FIGS. 4A to 4C.

Furthermore, in a mobile terminal according to the present invention, when the content of the first screen information 210 is changed, the controller 180 may change the content of the second screen information 220 to display updated second screen information 220 in the second region 320 associated with the changed content of the first screen information 210 in response to a user's touch input to the first region 310, as illustrated in FIG. 5A(a).

As illustrated in FIG. 5A(a), the flexible display unit 151 may be divided into the first region 310 and second region 320 based on the flexure of the flexible display unit 151. Furthermore, when the first screen information 210 containing map information corresponding to an execution screen of a map application is displayed on the first region 310, the second screen information 220 containing a plurality of items (or objects) corresponding to "restaurants" information located in the region shown by the map information of the first screen information may be displayed on the second region 320.

Furthermore, when the first region 310 corresponding to the first screen information 210 is moved using a touch input as illustrated in FIGS. 5A(a) and 5A(b), map information (or first screen information 210') at least part of which different from the previously displayed map information (or first screen information 210) illustrated in FIG. 5A(a) may be displayed on the first region 310.

In this manner, when the different first screen information 210' is displayed in response to the touch input, the controller 180 may display at least partially different second screen information 220' such that the second screen information 220' displayed on the second region 320 contains information associated with the different first screen information 210'.

Accordingly, as illustrated in FIG. 5A(b), the different second screen information 220' displayed on the second region 320 may include an item (or object) at least partially different from the previously displayed second screen information 220 illustrated in FIG. 5A(a).

For another example, when any one of a plurality of items (or objects) contained in the second screen information 220 displayed in the second region 320 is moved to the first region 310, the controller 180 may change the visual appearance of the any one item (or object).

For example, as illustrated in FIG. 5B(a), when the first screen information 210 corresponding to a send mail screen of a mail application is displayed in the first region 310 along with an "Attachments" screen 211, a plurality of data items (or objects) that can be appended to the "Attachments" screen 211 may be displayed on the second region 320 that was generated in response to the flexure of the flexible display unit 151.

Furthermore, as illustrated in FIGS. 5B(a) and 5B(b), when any one data item (or object) 221 of the plurality of data items (or objects) in the second region 320 is moved to the first region 310, the controller 180 may change the first screen information 210 of the first region 310 illustrated in FIG. 5B(b) to a new screen information 210' to indicate that the moved data item (or object) 221 is appended to a changed "Attachments" screen 211'.

Furthermore, the controller 180 may change the visual appearance of the data item (or object) 221 based on which of the first 310 and the second 320 regions the moved data item (or object) 221 is located.

In other words, the moved data item (or object) 221 may be displayed in an image icon when the data item (or object) 221 is located in the second region 320, and the moved data item (or object) 221 may be displayed in text when the moved data item (or object) 221 is located in the first region 310.

As described previously, in a mobile terminal according to the present invention, when information is changed in one region while the display is divided based on the flexure of the flexible display unit, it is possible to change the information of another region which is dependent on the changed region. Accordingly, it is possible to always receive information associated with the currently displayed information.

Hereinafter, the examples of second screen information displayed in response to the flexure of the flexible display unit 151 according to the type of the first screen information previously displayed on the flexible display unit 151 before a flexure is sensed will be described in more detail along with the accompanying drawings. FIGS. 6A to 6J are conceptual views for explaining a method of displaying associated information based on the flexure of a flexible display unit in a mobile terminal according to an embodiment of the present invention.

Previously, a method of dividing the flexible display unit 151 in the first 310 and the second 320 regions based on the flexure of the flexible display unit 151 and displaying the first screen information 210 and second screen information 220 in each region has been described. The second screen information 220 is information containing information associated with the first screen information 210, and the controller 180 (referring to FIG. 1) may determine information to be displayed as second screen information 220 according to the type of first screen information 210 displayed.

Furthermore, the type of second screen information 220 to be displayed in correspondence to the first screen information 210 may be determined for the first screen information 210 on the memory 160 (refer to FIG. 1) in advance. Hereinafter, specific examples of the second screen information 220 that can be displayed based on the first screen information 210 will be described.

Figure 6A:
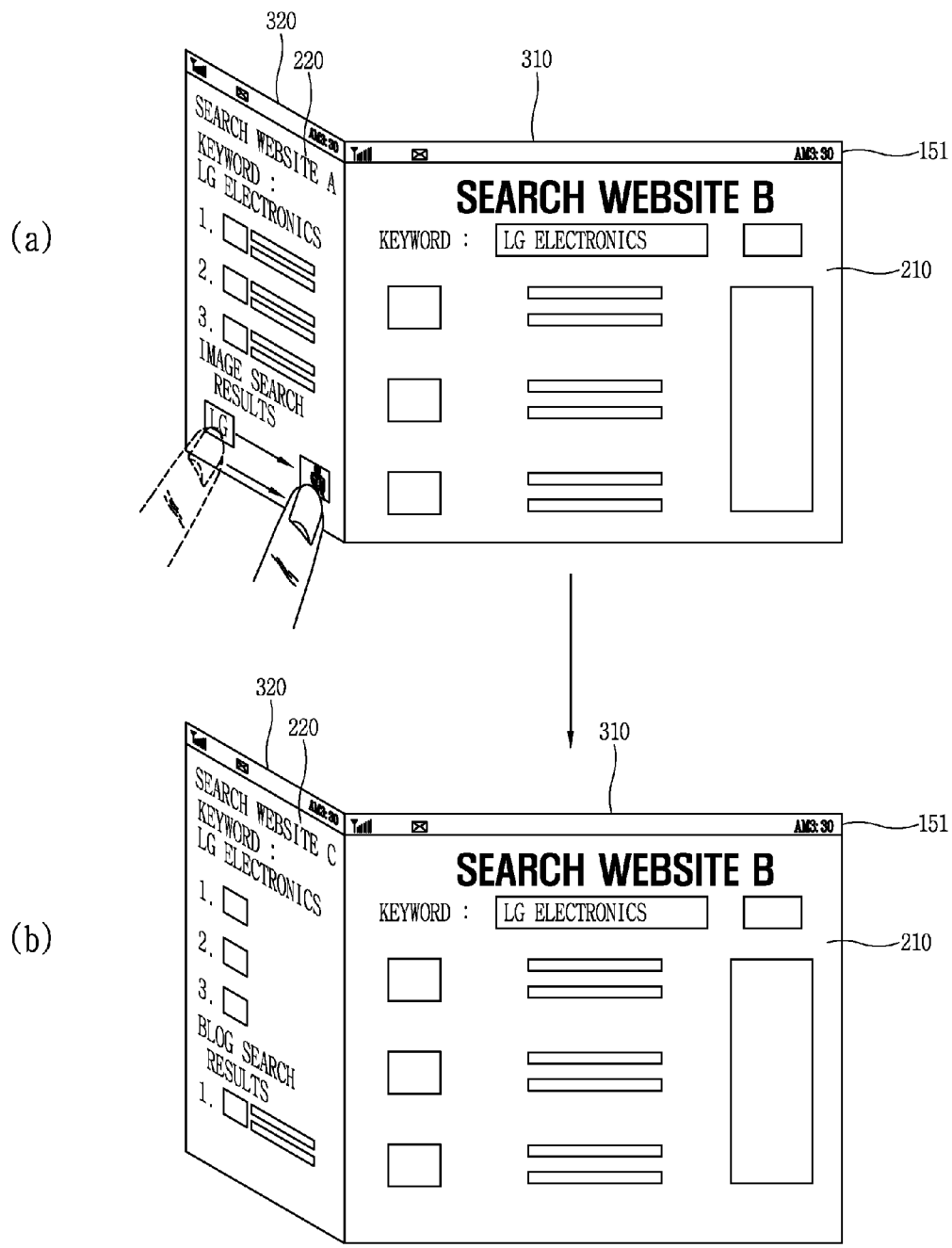

Referring to FIG. 6A, when a search screen for searching information is displayed on the first region 310, a search screen for a second search site that is different from the search site is displayed on the second region 320. Furthermore, when a touch input corresponding to a predefined input is applied to the second region 320, a search screen for a third search site that is different from the second search site will be displayed on the second region 320, as illustrated in FIG. 6A(b). The touch input corresponding to a predefined input may be a drag, slide, or flick touch input.

Figure 6B:
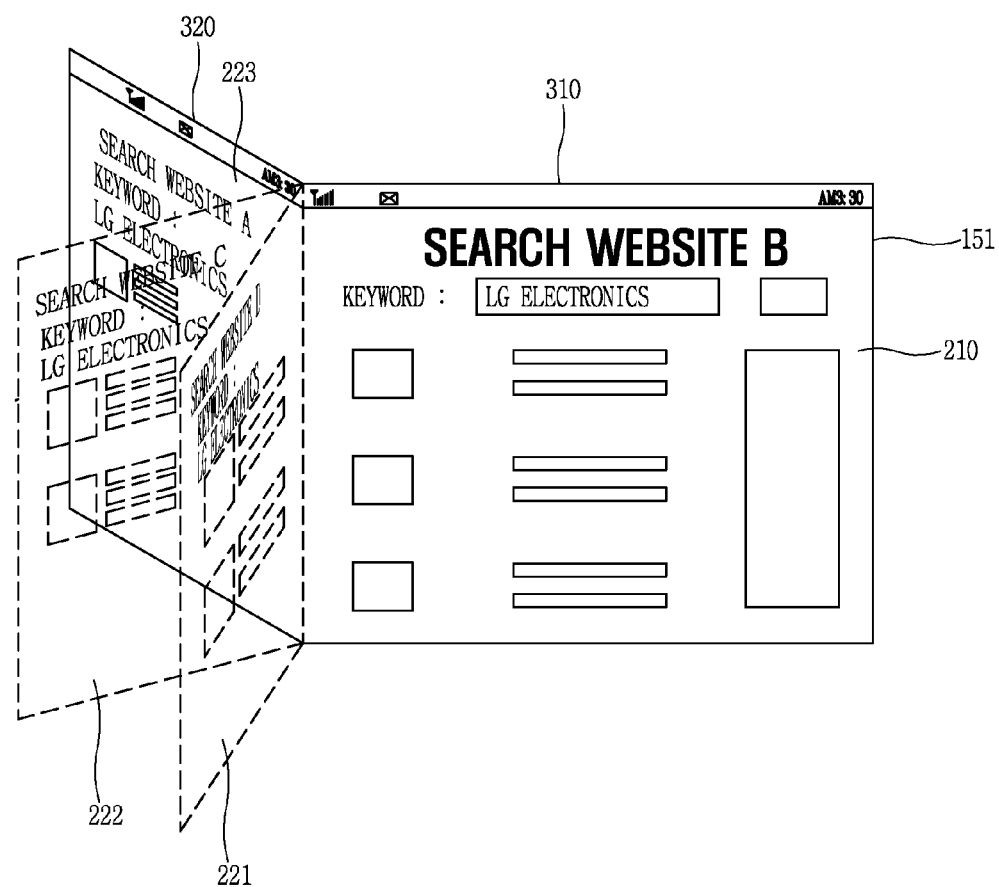

On the other hand, the controller 180 may control the flexible display unit 151 to display at least search screens corresponding to the second, the third, or a fourth search site that are different from each other in a three-dimensional stereoscopic image using different three-dimensional depth values, as illustrated in FIG. 6B.

The flexible display unit 151 may be configured with a stereoscopic display unit for displaying stereoscopic images. The stereoscopic image may represent a three-dimensional stereoscopic image, which is an image for allowing the user to feel a sense of gradual depth perception similar to a real space, in which an object is located on a monitor or screen.

The three-dimensional stereoscopic image may be implemented using binocular disparity. Binocular disparity means a disparity carried out by two eye positions located away from each other by about 65 mm such that each of the two eyes views different two-dimensional images, resulting in the viewer feeling the depth perception of a stereoscopic image when the images are transferred to the brain through the retina and combined with each other.

According to the present invention, the term "depth value" refers to an index indicating a distance difference between objects contained in a three-dimensional image. More specifically, when an object displayed on the display unit 151 is viewed by the user in a two-dimensional format, the depth value of the object may be defined as "0", or located on the "0" depth value plane.

However, the depth value of an object viewed as a shape protruding toward the user from the flexible display unit 151 in a three-dimensional format may be defined as a negative value. The depth value of an object viewed as a shape extending away from the user from the flexible display unit 151 may be defined as a positive value. Moreover, the absolute depth value of the object increases as the location of an object contained in a three-dimensional image increases in distance from the "0" depth value plane. Likewise, the absolute depth value of the object decreases as the location of the object contained in a three-dimensional image decreases in distance from the "0" depth value plane.

The three-dimensional depth values of the search screens 221, 222, 223 illustrated in FIG. 6B may be controlled by a user's selection or a setting of the controller. Though not shown in the drawings, the controller 180 may control the flexible display unit 151 to terminate the search screens 221, 222, 223 having different three-dimensional depth values displayed in a three-dimensional stereoscopic image based on the user's selection, and display only one of the search screens 221, 222, 223 a two-dimensional image on the second region 320.

Figure 6C:
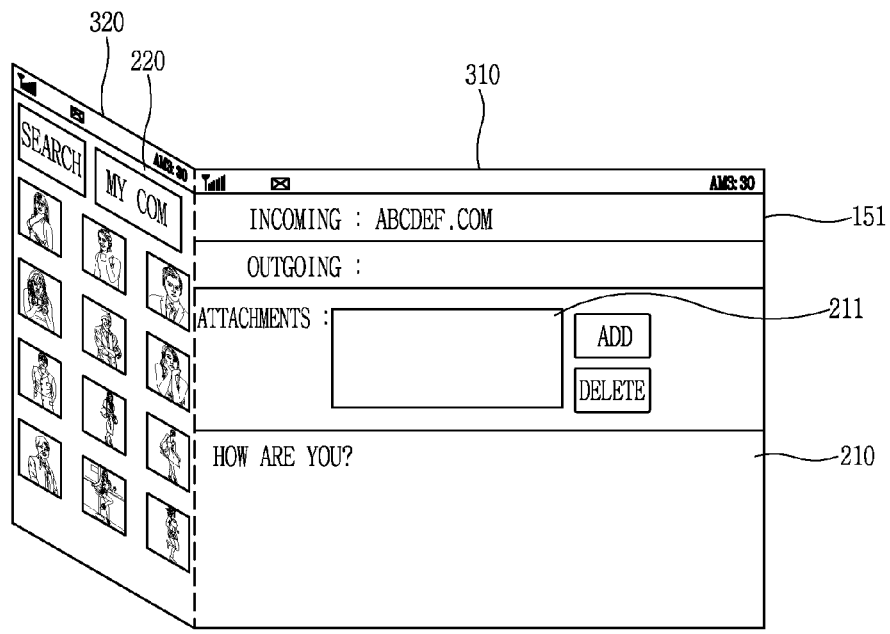

Referring to FIG. 6C, when the first screen information 210 corresponding to a send mail screen of the mail application is displayed on the first region 310, a plurality of data items (or objects) that can be appended to the send mail screen may be displayed on the second region 320 in response to a flexure of the flexible display unit 151.

Figure 6D:
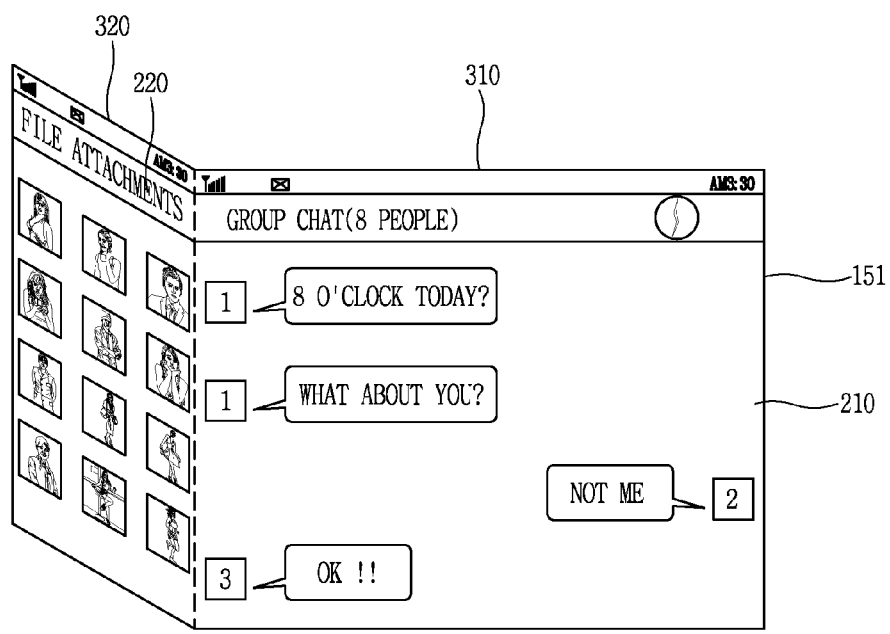

Referring to FIG. 6D, when a chat screen of a messaging application for receiving or sending instant messages from or to an external terminal is displayed on the first region 310, items (or objects) corresponding to transmittable data using the messaging application may be displayed on the second region 320 in response to a flexure of the flexible display unit 151.

Figure 6E:
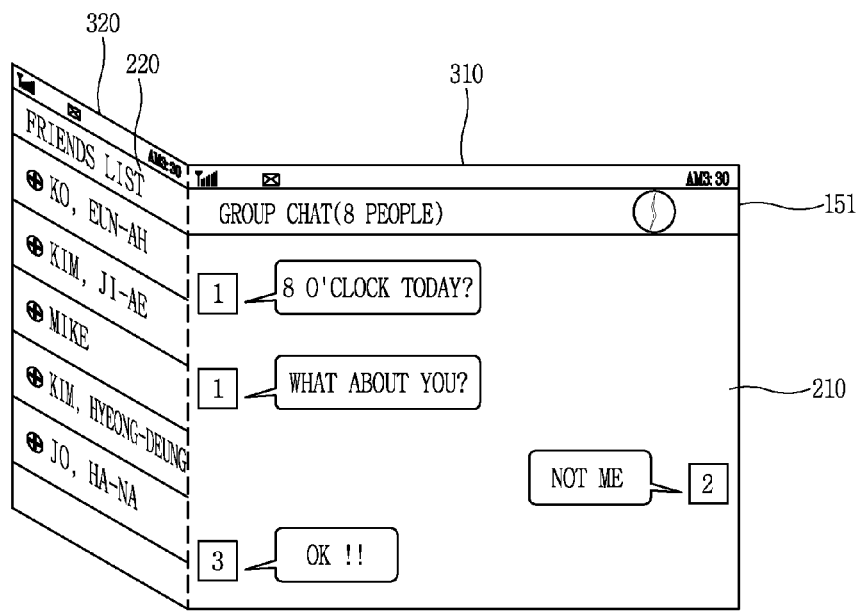

Referring to FIG. 6E, when a chat screen of a messaging application for receiving or sending instant messages from or to an external terminal is displayed on the first region 310, conversation counterparts (or objects) that can be added to a chat room corresponding to the chat screen displayed on the first region 310 may be displayed on the second region 320.

Figure 6F:
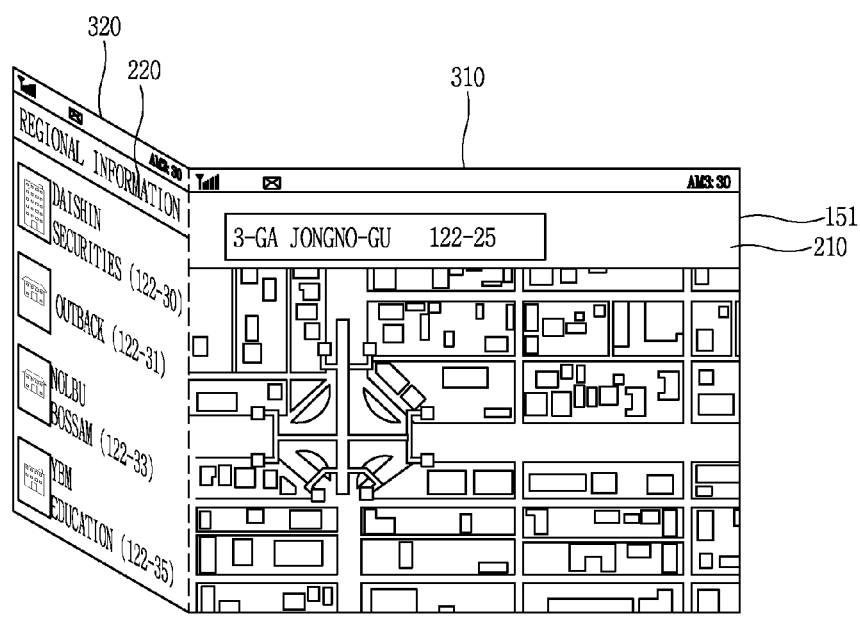

Referring to FIG. 6F, when a map screen corresponding to a navigation (or map) application is displayed on the first region 310, information corresponding to the map screen area displayed in the first region 310 may be displayed on the second region 320.

Figure 6G:
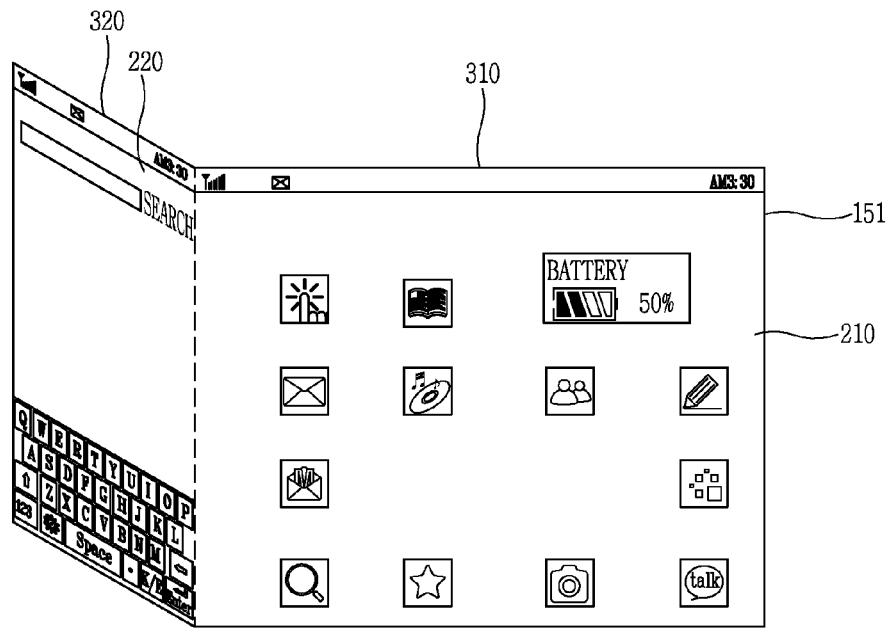

Referring to FIG. 6G, when a home screen page is displayed on the first region 310, a search screen capable of searching applications installed in the mobile terminal or data stored in the mobile terminal may be displayed on the second region 320.

Figure 6H:
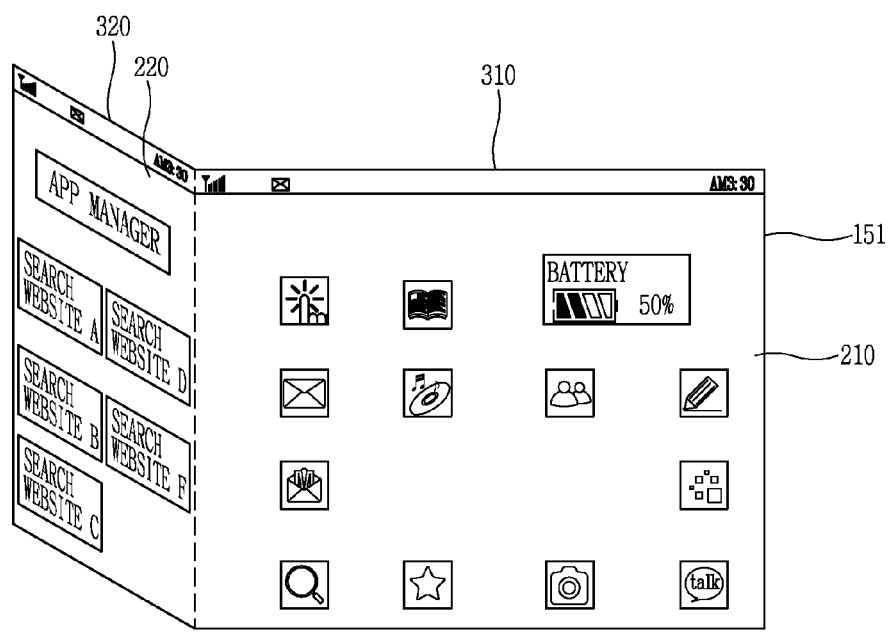

Referring to FIG. 6H, when a home screen page is displayed on the first region 310, an application management screen for managing applications installed in the mobile terminal may be displayed in the second region 320, and the icons of recently executed applications may be displayed on the application management screen.

Figure 6I:
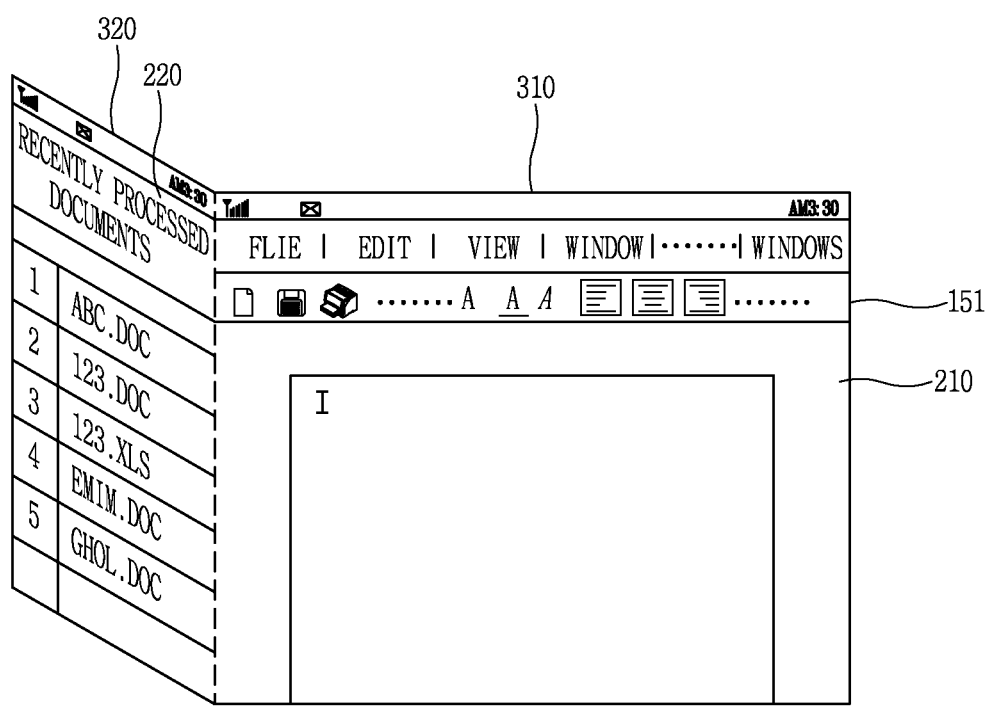

Referring to FIG. 6I, when a word processing screen corresponding to the word processing application is displayed on the first region 310, data (or document) items (or objects) recently processed using the word processing application may be displayed on the second region 320.

Referring to FIG. 6J(a), the controller 180 may display second screen information 220 for searching applications installed in the mobile terminal or data stored in the memory 160 on the second region 320, regardless of the type of screen information displayed in the first region 310. A plurality of index items (or objects) divided to correspond to preset search criteria may be displayed as second screen information 220. Furthermore, as illustrated in FIG. 6J(b), when one index item (or object) 221 is selected from the plurality of index items (or objects), the controller 180 may display information 250 corresponding to the index item (or object) 221 on the first region 310.

As described above, in a mobile terminal according to the present invention, various types of second screen information 220 may be displayed on the second region 320 depending on the type of first screen information 210 displayed on the first region 310. Various other second screen information based on the type of first screen information may be displayed in addition to the foregoing examples.

A method of displaying a preview screen for one information item (or object) selected by a user from screen information displayed in the second region will be described in more detail along with the accompanying drawings. FIGS. 7A to 7F are conceptual views for explaining a method of displaying information on a boundary region in a mobile terminal 100 according to an embodiment of the present invention.

In a mobile terminal according to the present invention, the controller 180 may divide a region of the flexible display unit 151 in response to a flexure of the flexible display unit 151, and display screen information containing information associated with the screen information displayed on the flexible display unit 151 prior to dividing the region. Furthermore, the controller 180 may provide detailed information, summary information, or associated information on any one information item (or object) based on the user's selection from the information item (or objects) to inform the user of the details or contents of the information item (or object) with which it is associated.

For an example, the controller 180 may display a preview screen with detailed information or summary information corresponding to the selected information item (or object) from the information items (or objects).

For example, the flexible display unit 151 may be divided into a first region 310 and a second region 320 according to a location at which the flexure of the flexible display unit 151 is sensed. Furthermore, when any one information item (or object) displayed as second screen information 220 in the second region 320 containing information associated with the first screen information 210 is located on a boundary line between the first region 310 and second region 320, detailed information on the one information item (or object) is displayed on the flexible display unit 151.

Figure 7A:
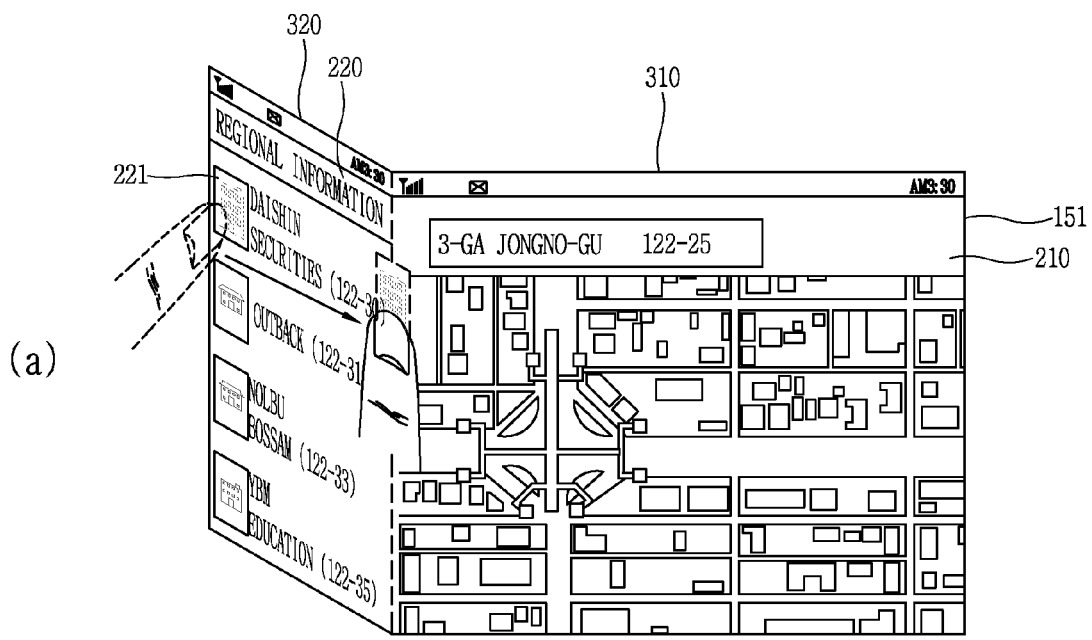
Figure 7A:
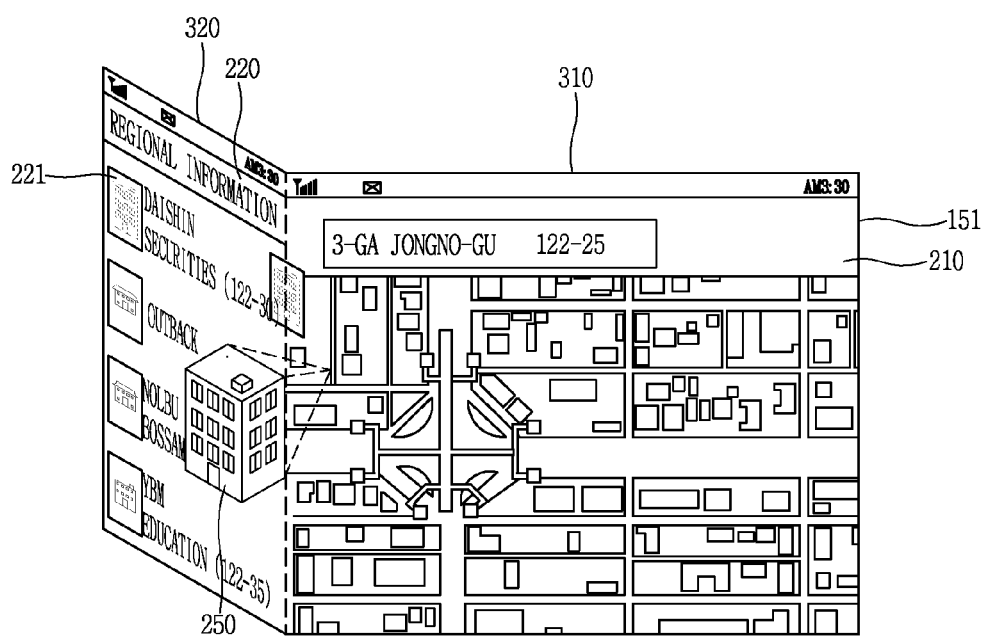

As illustrated in FIG. 7A(a), when a map screen corresponding to a navigation (or map) application is displayed on the first region 310, information of the area corresponding to the map screen on the first region 310 may be displayed on the second region 320. When one information item (or object) 221 of the information items displayed in the second region 320 is located at a boundary line (or boundary area) between the first region 310 and second region 320 based on a user's selection, the controller 180 displays detailed information 250 corresponding to the one information item (or object) 221 as illustrated in FIG. 7A(b). The detailed information 250 may be displayed according to the type of the information item (or object) 221, such as images of buildings corresponding to the relevant map area information if the information item (or object) 221 is related to the map area information. Furthermore, the controller 180 may control the flexible display unit 151 to display the detailed information or a preview screen as a three-dimensional stereoscopic image having a three-dimensional depth value other than "0".

On the other hand, when the information item (or object) 221 is passed through a boundary between the first 310 and the second 320 region and moved to the first region 310 from the second region 320 as illustrated in FIG. 7B(a), the controller 180 may control the mobile terminal such that an address corresponding to the information item (or object) 221 is set as a destination, as illustrated in FIG. 7B(b).

Figure 7C:
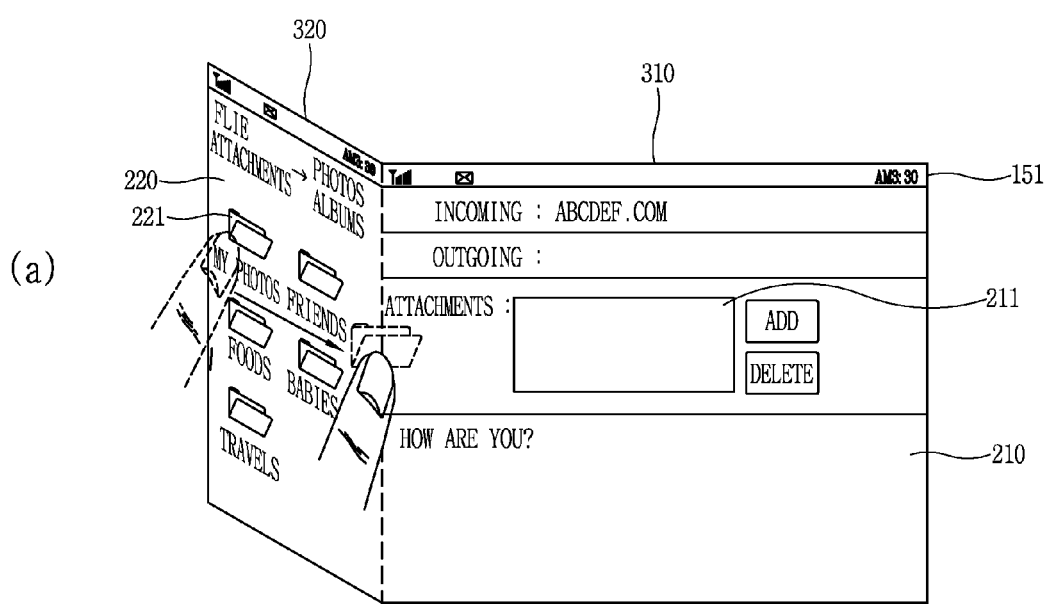
Figure 7C:
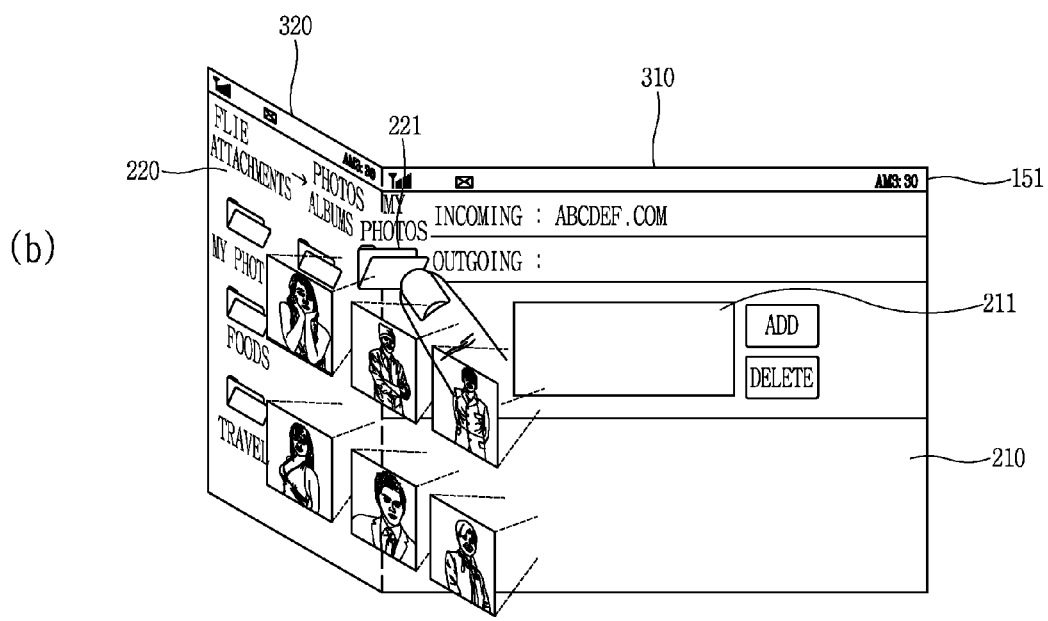

When any one image folder 221 containing at least one image is located on a boundary area between the first region 310 and second region 320, the controller 180 may control the flexible display unit 151 to display thumbnail images for the at least one image contained in the one image folder 221, as illustrated in FIG. 7C(b). Furthermore, the controller 180 may control the flexible display unit 151 to display the thumbnail images as three-dimensional stereoscopic images having a three-dimensional depth value other than "0". Furthermore, when the one image folder 211 is moved to the "Attachments" screen of a send mail screen in first region 310 from the second region 320 as illustrated in FIG. 7D(a), the controller 180 may append the folder as an attachment file to the mail screen displayed on the first region 310, as illustrated in FIG. 7D(b).

Figure 7E:
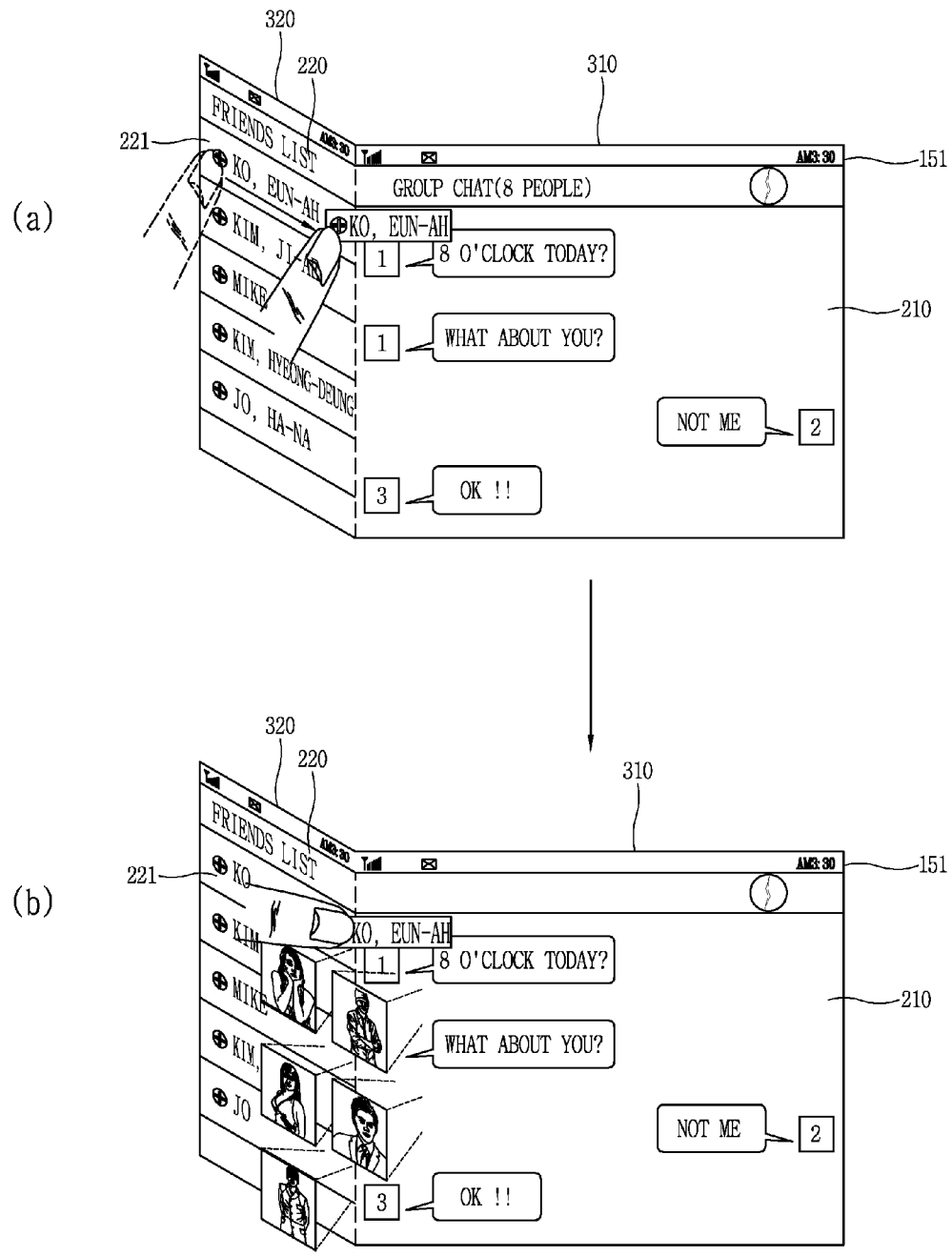

When any one conversation counterpart item (or object) 221 to be added to a chat room corresponding to a chat screen displayed on the first region 310 is moved to a boundary area between the first region 310 and second region 320 as illustrated in FIG. 7E(a), the controller 180 controls the flexible display unit 151 to display at least one thumbnail image associated with the conversation counterpart item (or object) 221, as illustrated in FIG. 7E(b). A thumbnail image associated with the conversation counterpart item (or object) 221 may be an image that has been posted by a person corresponding to the conversation counterpart item (or object) 221 or an image for which information corresponding to the person is tagged in the memory 160. Furthermore, the controller 180 may control the flexible display unit 151 to display the thumbnail image as a three-dimensional stereoscopic image having a three-dimensional depth value other than "0".

Figure 7F:
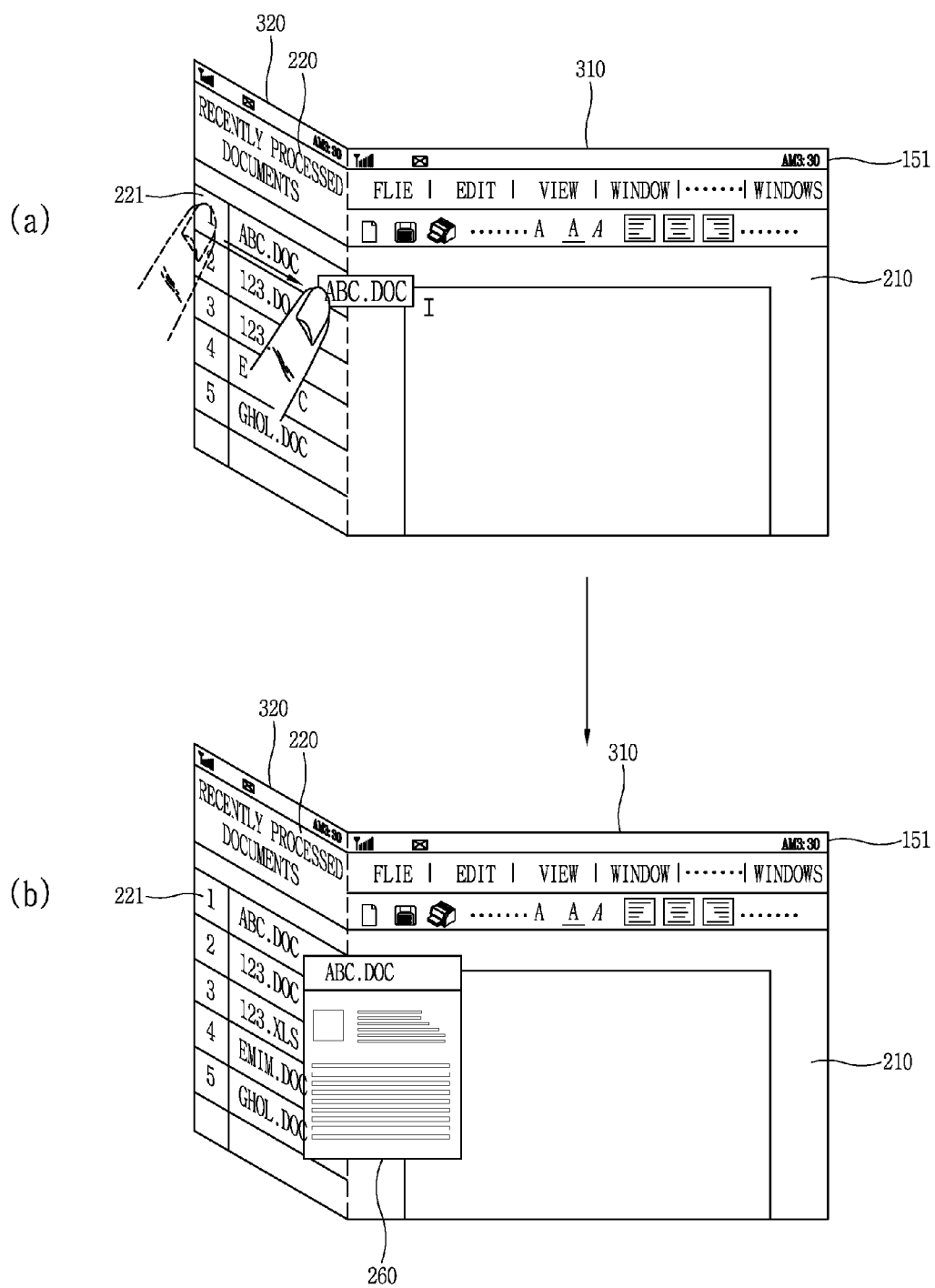

When any one plurality of data (or document) items (or objects) 221 recently processed with a word processing application is moved to a boundary area between the first region 310 and second region 320 as illustrated in FIG. 7F(a), the controller 180 may control the flexible display unit 151 to display a preview screen 260 containing summary information of the data (or document) item (or object), as illustrated in FIG. 7F(b). Furthermore, the controller 180 may control the flexible display unit 151 to display the preview screen 260 as a three-dimensional stereoscopic image having a three-dimensional depth value other than "0".

As described previously, in a mobile terminal according to the present invention, when a data item (or object) or an information item (or object) 221 is moved to a boundary line between the divided regions according to a flexure of the flexible display unit 151, the controller 180 may generate a control signal for displaying information corresponding to the moved data item (or object) or information item (or object).

Figure 8A:
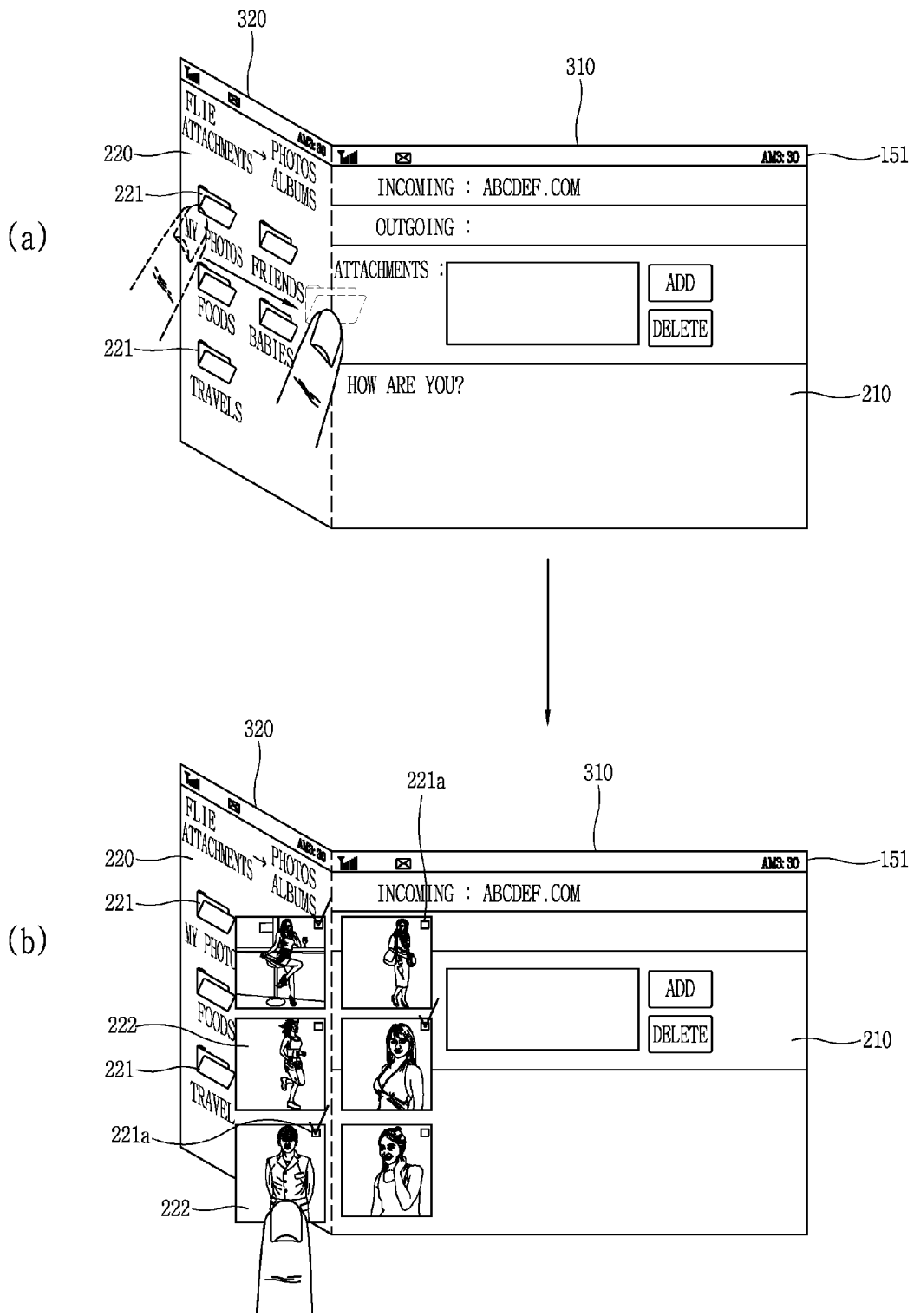
FIGS. 8A and 8B are conceptual views for explaining a method of selecting information on a boundary region in a mobile terminal according to an embodiment of the present invention.
Figure 8B:
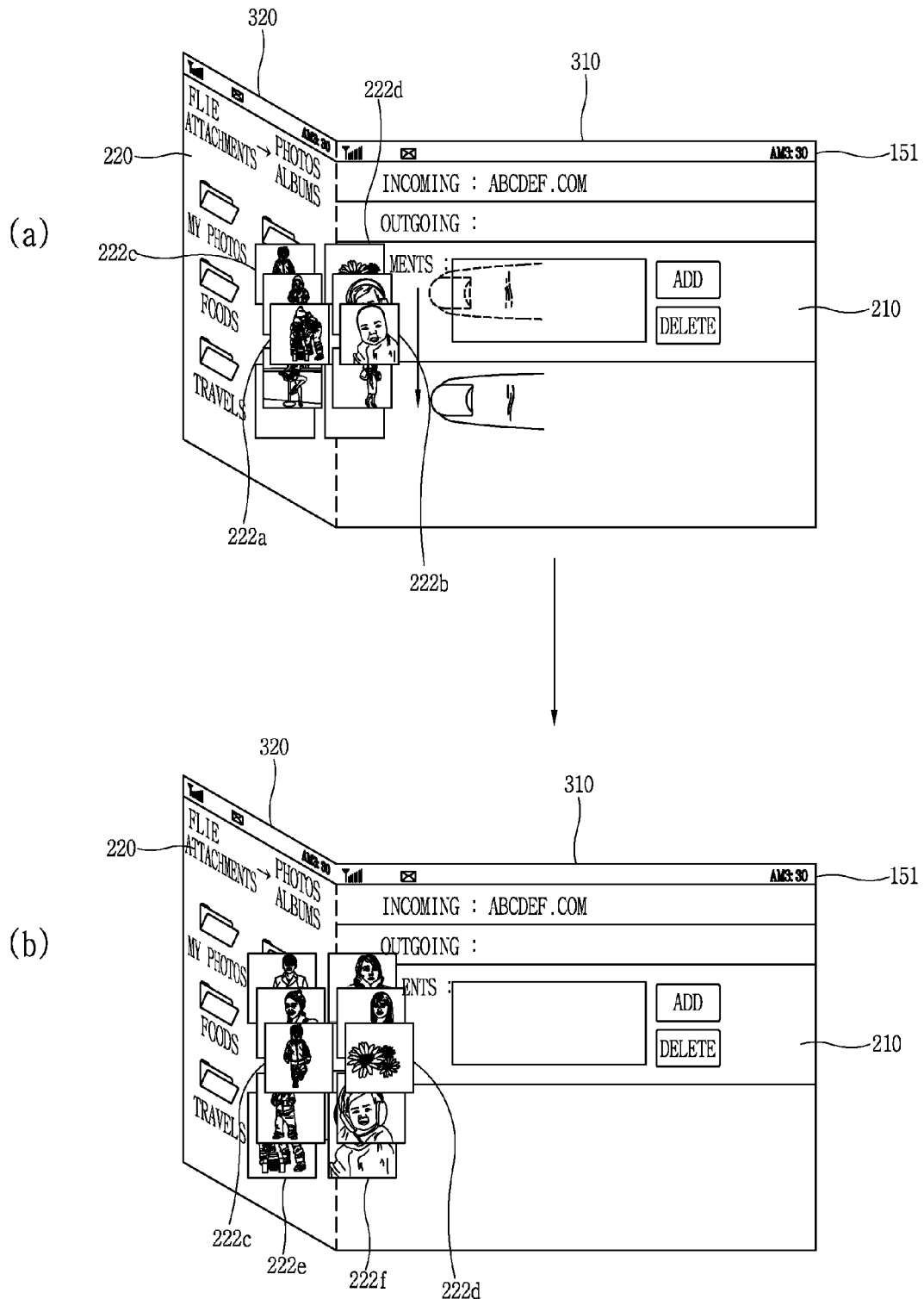

A method of selecting an image on a boundary area between the first region 310 and second region 320 divided according to a flexure of the flexible display unit 151 will be described in more detail. FIGS. 8A and 8B are conceptual views for explaining a method of selecting information on a boundary region in a mobile terminal 100 according to an embodiment of the present invention.

As described previously, in a mobile terminal 100 according to the present invention, the flexible display unit 151 may be divided into a first region 310 and a second region 320 based on a location at which a flexure of the flexible display unit 151 is sensed. Furthermore, first screen information 210 may be displayed in the first region 310, and second screen information 220 may be displayed in the second region 320, and a plurality of folders (or groups) 221 containing information associated with the first screen information 210 may be displayed as second screen information 220.

The controller 180 may display at least one detailed item (or object) contained in the at least one folder (or group) 221 when at least the plurality of folders (or groups) is located on a region corresponding to the boundary line between the first region 310 and second region 320. Furthermore, the controller 180 may provide a user interface to receive the user's selection for at least one of the at least one detailed item (or object). Moreover, the controller 180 may move the at least one detailed item (or object) selected by the user to the first region 310 from the second region 320.

Referring to FIG. 8A(a), when any one image folder 221 is located on a boundary area between the first region 310 and second region 320 when image folders (or groups) containing at least one image are displayed on the second region 320 as illustrated in FIG. 8A(a), the controller 180 may control the flexible display unit 151 to display thumbnail images 222 for at least one image contained in the image folder 221. Furthermore, the controller 180 controls the flexible display unit to display a selection window 221a for receiving the user's selection on a region of each thumbnail image 221. The controller 180 may control the mobile terminal 100 such that only data corresponding to at least one thumbnail image 222 selected by the user via the selection window 221a from a plurality of thumbnail images 222 displayed on the boundary area can be appended to a mail screen displayed on the first region 310.

The controller 180 may display the thumbnail images 222 as three-dimensional stereoscopic images having three-dimensional depth values other than "0", such that the three-dimensional depth value of a thumbnail image selected by the user is different from the three-dimensional depth values of thumbnail images not selected by the user. Furthermore, the controller 180 may change a scheme of displaying thumbnail images on the flexible display unit 151 in various ways, such as displaying the thumbnail images 222 in an overlapped manner when there are a lot of thumbnail images to be displayed on the boundary area.

As illustrated in FIG. 8B(b), the controller 180 may control the flexible display unit to display thumbnail images 222c, 222d that are different from thumbnail images 222a, 222b displayed in FIG. 8B(a) based on the user's touch input. In other words, the user may search thumbnail images displayed on the boundary area based on a touch input.

Figure 9A:
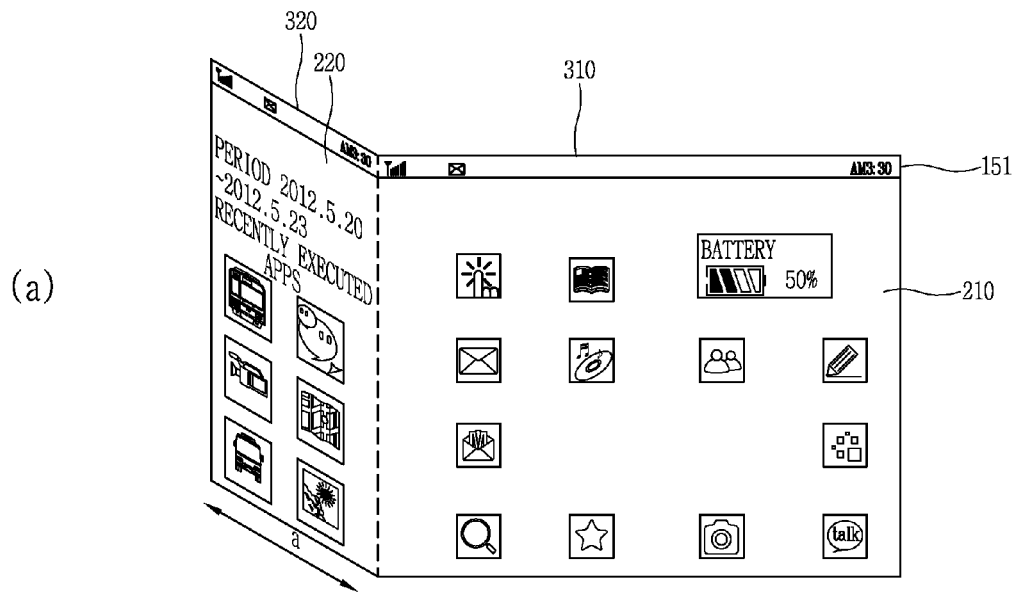
FIGS. 9A to 9C are conceptual views for explaining a method of displaying information in different ways based on the flexure characteristics of a flexible display unit in a mobile terminal according to an embodiment of the present invention.
Figure 9A:
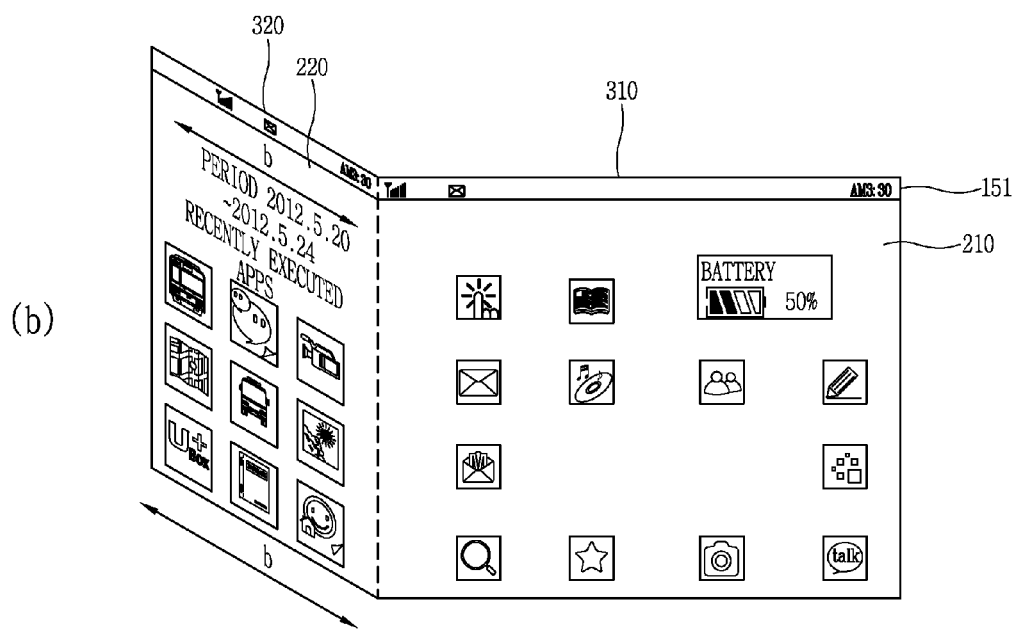
Figure 9B:
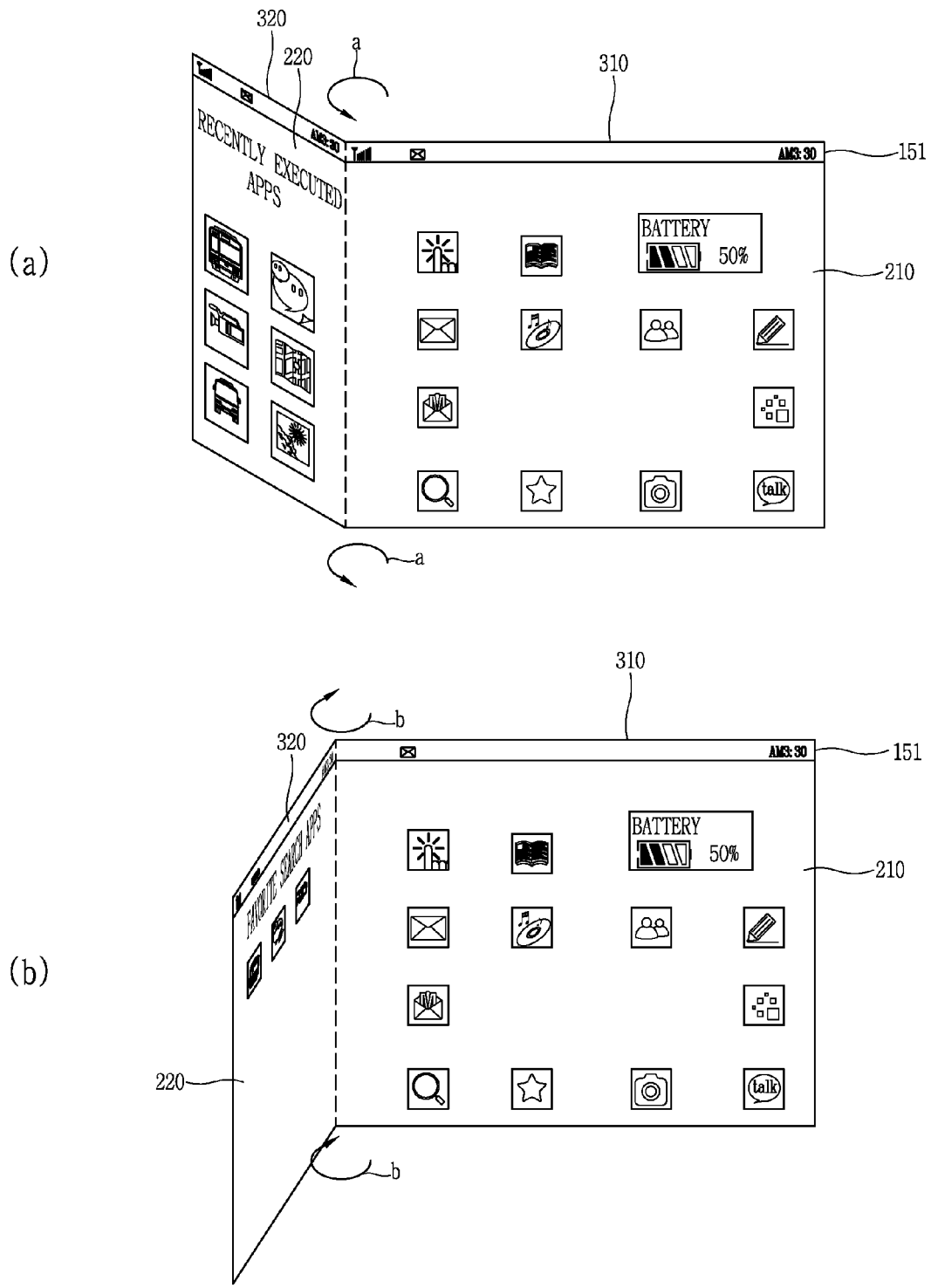
Figure 9C:
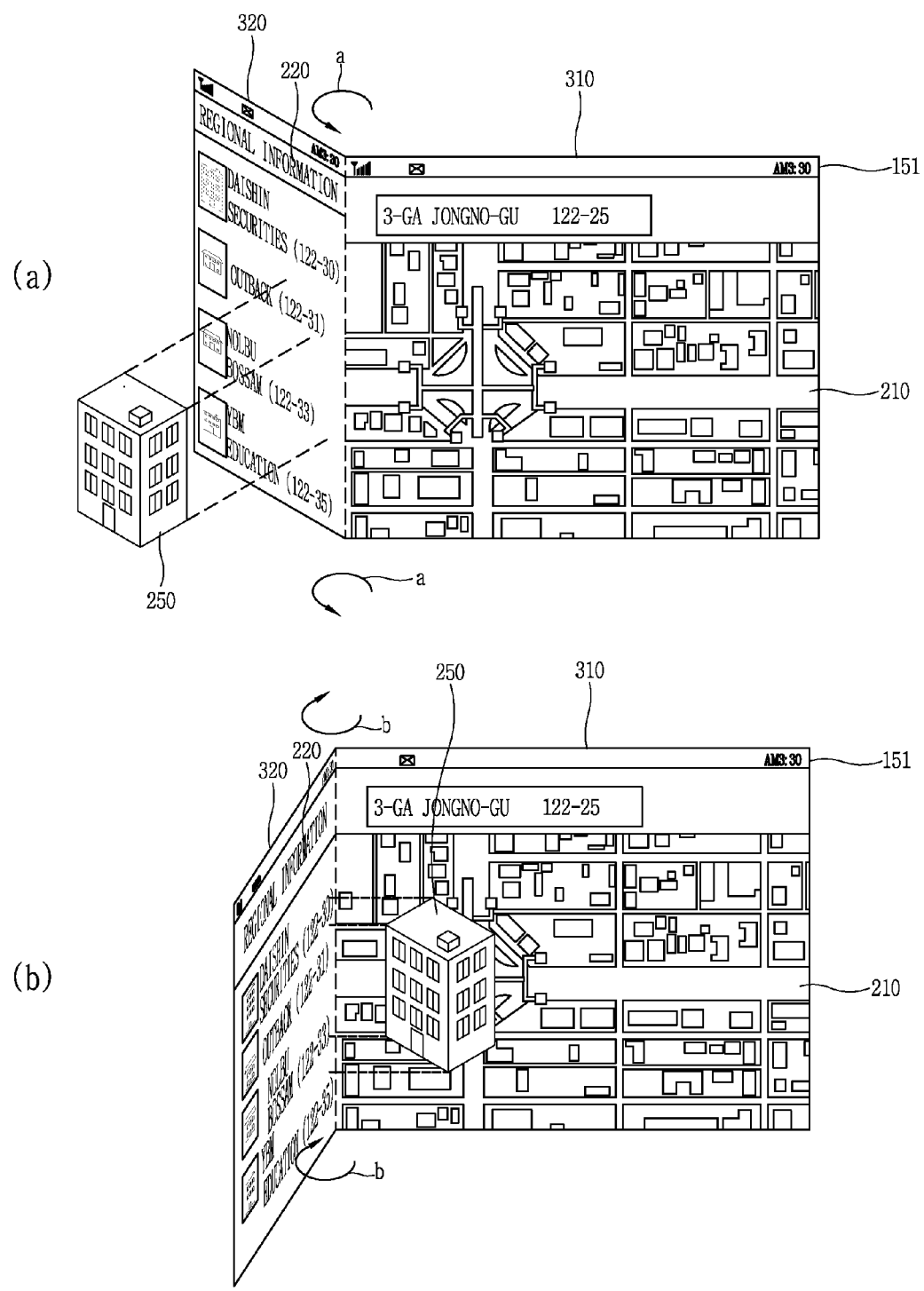

As described previously, a mobile terminal 100 according to the present invention may select data required by the user using a boundary area generated by a flexure of the flexible display unit 151. Screen information displayed on the second region 320 based on flexure attribute information related to a flexure of a flexible display unit 151 will be described in more detail along with the accompanying drawings. FIGS. 9A to 9C are conceptual views for explaining a method of displaying information in different ways based on flexure attributes of a flexible display unit 151 in a mobile terminal 100 according to an embodiment of the present invention.

As described previously, in a mobile terminal 100 according to the present invention, the flexible display unit 151 is divided into a first 310 and a second 320 region based on a location at which a flexure of the flexible display unit 151 is sensed. First screen information 210 is displayed in the first region 310, and second screen information 220 is displayed in the second region 320. The second screen information 220 may include information associated with the first screen information 210.

The controller 180 may display the second screen information 220 in a different manner based on different flexure attributes of the flexible display unit 151. The flexure attribute information may be information associated with at least a number of flexures, a strength of a flexure, a degree of a flexure, a location of a flexure, a direction of a flexure, or a duration of a flexure of the flexible display unit 151. As an example, the controller 180 may control the flexible display unit 151 to change the amount of information contained in the second screen information 220 displayed in the second region 320 based on a location of the flexure of the flexible display unit 151.

As illustrated in FIGS. 9A(a) and 9A(b), the controller 180 may control the flexible display unit 151 to change a size of the second region 320 based on a location of the flexure of the flexible display unit 151. The controller 180 may display a different amount of second screen information 220 based on the size of the second region 320.

As illustrated in FIG. 9A(a), the controller 180 displays application items (or objects) executed on the mobile terminal 100 during the period of May 20-23, 2012 on the second region 320 having a first length (a). As illustrated in FIG. 9A(b), the controller 180 displays application items (or objects) executed on the mobile terminal 100 during the period of May 20-24, 2012 on the second region 320 having a second length (b), which is longer than the first length (a). Though not shown, the controller 180 may control the amount of displayed information in a different manner based on the size difference between the second regions 320.

The controller 180 may display different screen information based on a direction of the flexure of the flexible display unit 151. As illustrated in FIG. 9B(a), when the flexible display unit 151 is bent in the first direction (a), the controller 180 displays second screen information 220 associated with "recently executed applications" on the second region 320. As illustrated in FIG. 9B(b), when the flexible display unit 151 is bent in the second direction (b), the controller 180 displays "favorite applications" as second screen information 220, which is different from the second screen information 220 associated with "recently executed applications".

The controller 180 may display three-dimensional stereoscopic images having a different depth value based on a direction of a flexure of the flexible display unit 151. As illustrated in FIG. 9C(a), when the flexible display unit 151 is bent in the first direction (a) (toward the user), the controller 180 may control the flexible display unit 151 to have a negative three-dimensional depth value based on any one information item (or object) 250 contained in the second region 320 located at a boundary area between the first region 310 and second region 320. As illustrated in FIG. 9C(b), when the flexible display unit 151 is bent in the second direction (b) (away from the user), the controller 180 may control the flexible display unit 151 such that the information item (or object) 250 has a positive three-dimensional depth value.

As described previously, a mobile terminal 100 according to the present invention may display information on the flexible display unit 151 in various ways based on flexure attribute information of the flexible display unit 151. In addition to the foregoing embodiments, a mobile terminal 100 according to the present invention may display information in various ways based on various attribute information of the flexible display unit.

Figure 10A:
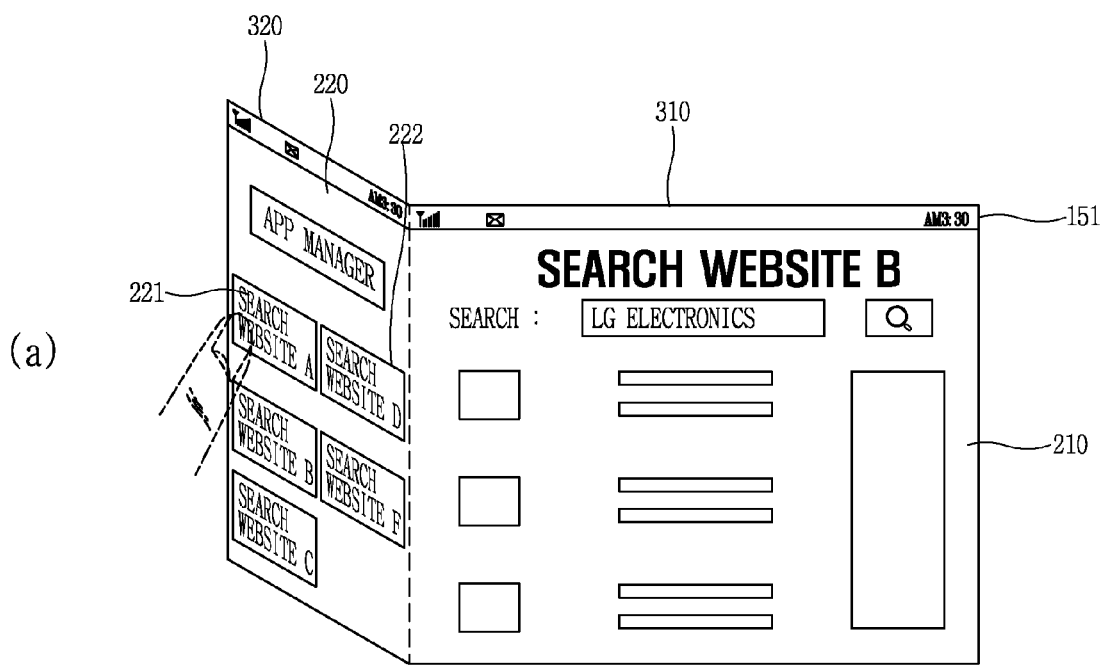
FIGS. 10A and 10B are conceptual views for explaining a method of displaying a preview screen in a mobile terminal according to an embodiment of the present invention.
Figure 10A:
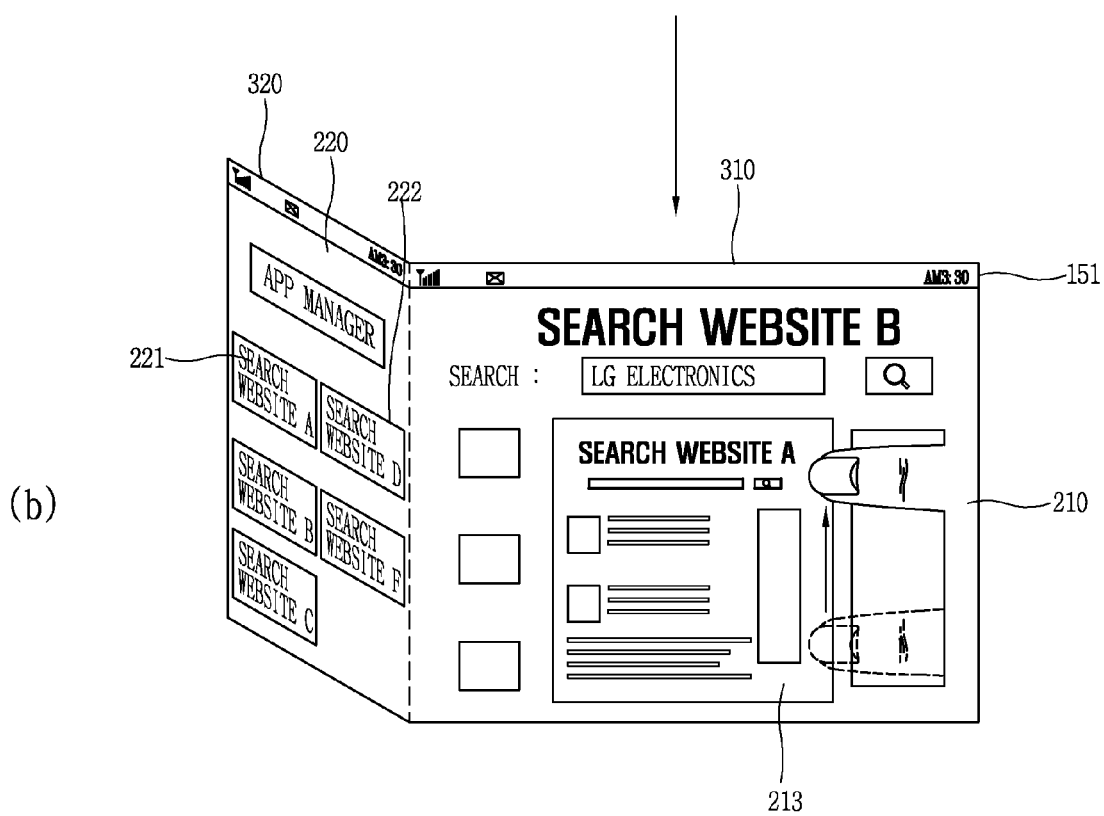
Figure 10B:
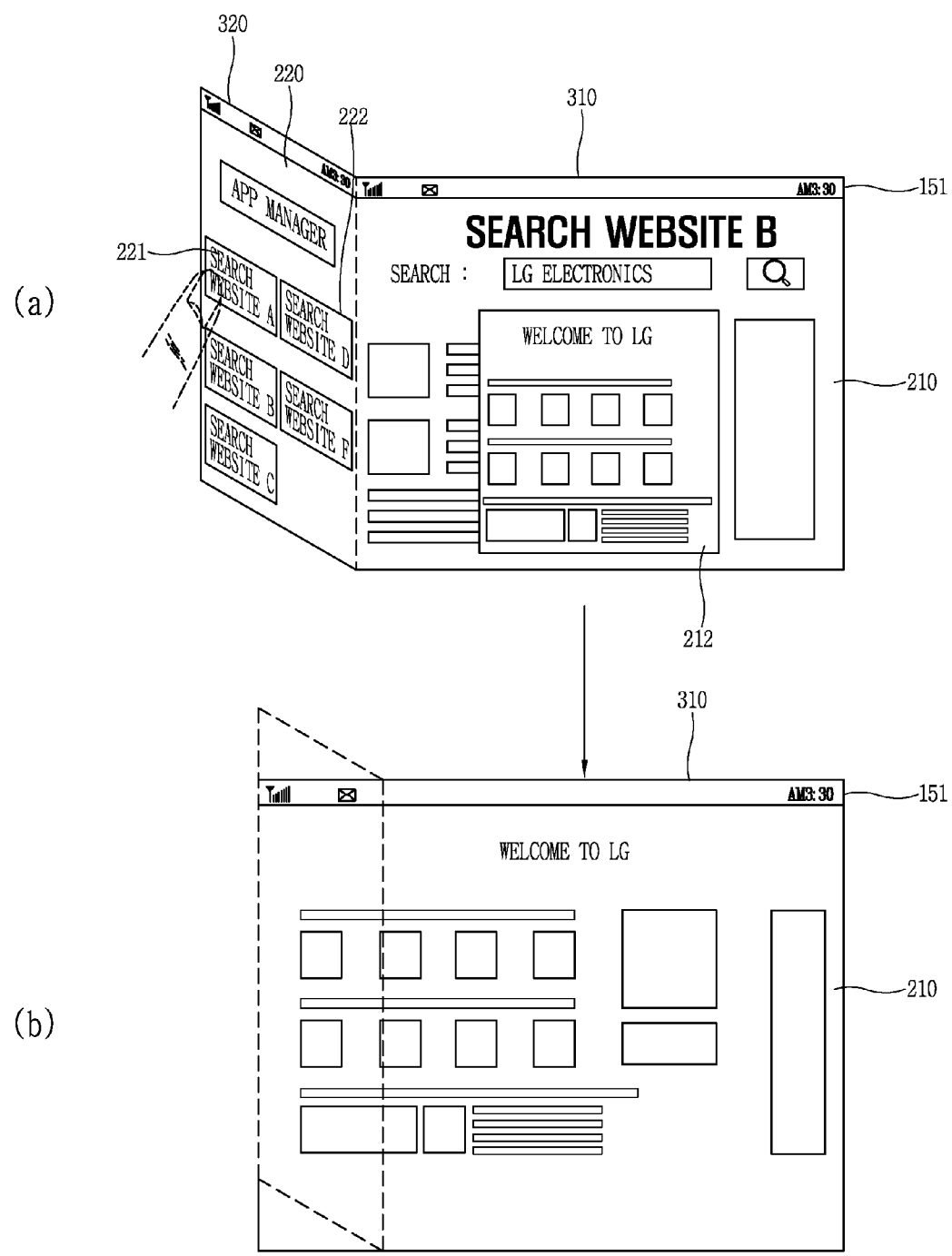

Hereinafter, a method of displaying a preview screen corresponding to a data item (or object) selected by a user while a flexure of the flexible display unit 151 is maintained will be described in more detail along with the accompanying drawings. FIGS. 10A and 10B are conceptual views for explaining a method of displaying a preview screen in a mobile terminal 100 according to an embodiment of the present invention.

When a web page screen is displayed as first screen information 210 on the first region 310 as illustrated in FIG. 10A(a), second screen information 220 may include favorite search items (or objects) 221, such as URL addresses corresponding to web pages other than the web page contained in the first screen information 210. Furthermore, when a favorite search item (or object) 221 is selected by the user from the second region 320 while a flexure of the flexible display unit 151 is maintained, the controller 180 may display a preview screen 213 on the first region 310 corresponding to the selected search item (or object) 221. When a touch input corresponding to a predefined input is applied to the preview screen 213 or the first region 310, as illustrated in FIG. 10A(b), the controller 180 displays a preview screen 212 corresponding to another item (or object) 221 instead of the preview screen 213 corresponding to the selected item (or object), as illustrated in FIG. 10B(a). The touch input corresponding to a predefined input may be a drag, slide, or flick touch input. The controller 180 may provide a preview screen of the second screen information 220 displayed in the second region 320 based on a touch input to the first region 310.

On the other hand, when the flexure of the flexible display unit 151 is restored to an original state while displaying the preview screen 213, the controller 180 may control the flexible display unit 151 to display a web page screen corresponding to the preview screen 212 on an entirety of the flexible display unit 151, as illustrated in FIG. 10B(b).

As described previously, a mobile terminal 100 according to the present invention divides the flexible display unit 151 into a first region 310 and a second region 320 in response to a flexure of the flexible display unit 151, and may display first screen information 210 on the first region 310 and second screen information 220 on the second region 320 containing information associated with the first screen information. Furthermore, the second screen information 220 may include a plurality of information (or data) items (or objects) 221 and the controller 180 may move one of the plurality of information items (or objects) 221 to the first region 310 based on a user's touch input.

The controller 180 may display an information item (or object) 221 being moved between regions in a highlight mode such that the one information item (or object) 221 being moved to the first region 310 from the second region 320 (or vice versa) is distinguishable by the user. Here, "highlight mode" may refer to displaying an information item (or object) 221 with an enlargement, reduction, color change or blinking effect, or changing the transparency of the information item (or object) 221, or changing a three-dimensional depth value of the information item (or object).

A method of displaying the one information item (or object) 221 in highlight mode based on the one information item (or object) 221 being moved from one region to another region will be described in more detail along with the accompanying drawings. FIGS. 11A to 12B are conceptual views for explaining a method of visually displaying a change of location via which information is displayed in a mobile terminal according to an embodiment of the present invention.

Figure 11A:
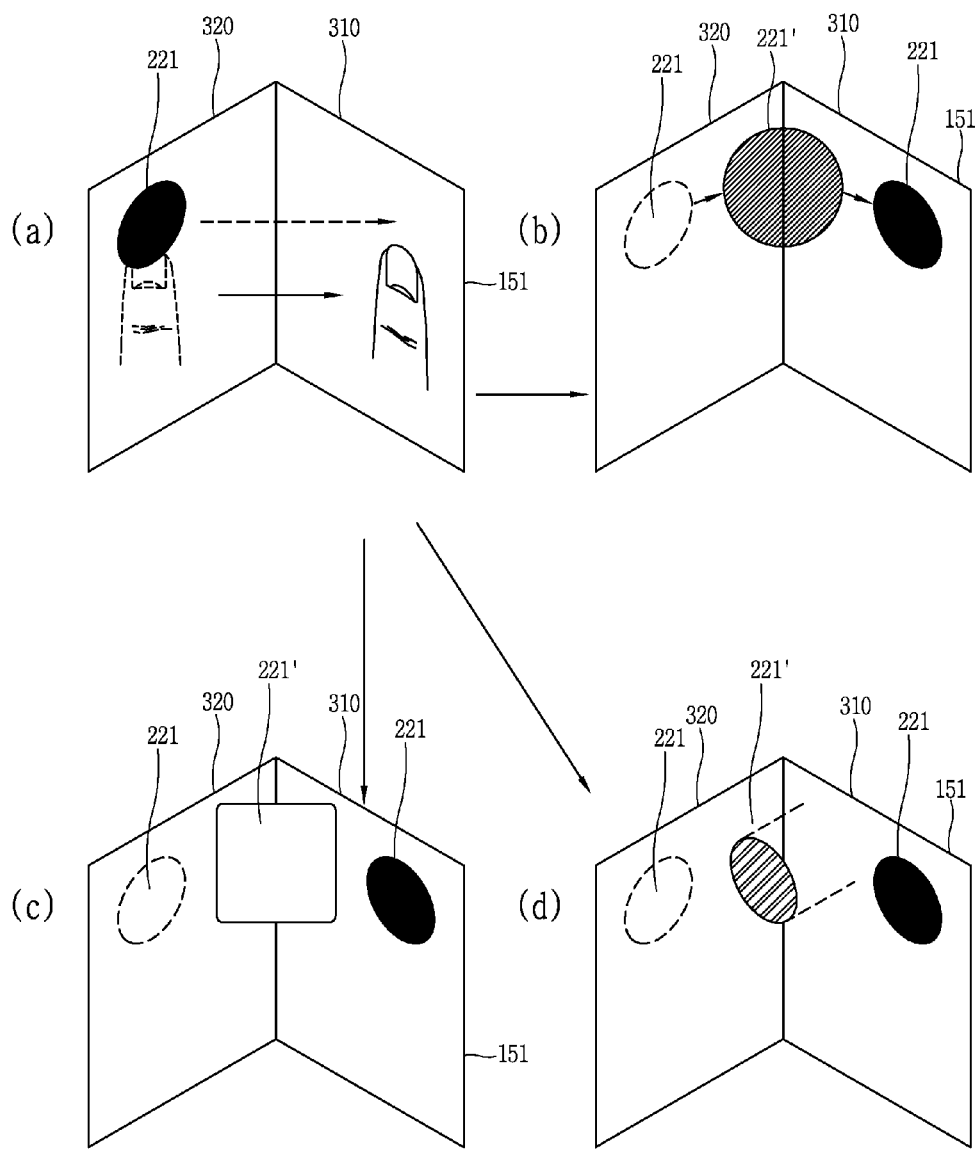
FIGS. 11A, 11B, 12A, and 12B are conceptual views for explaining a method of visually displaying a location being changed at which information is displayed in a mobile terminal according to an embodiment of the present invention.

In FIGS. 11A, 11B, 12A and 12B, the information item (or object) 221 is schematically illustrated as a diagram. First, as illustrated in FIG. 11A(a), the controller 180 moves the diagram 221 to the first region 310 based on a touch input for moving the diagram 221 from the second region 320 to the first region 310.

As a first example, the controller 180 may temporarily enlarge and display the diagram 221 when the diagram 221 is located at a boundary between the first region 310 and second region 320 as illustrated in FIG. 11A(b) while moving the diagram 221 from the second region 320 to the first region 310 (refer to reference numeral 221'). As a second example, when the diagram 221 is located at a boundary area between the first region 310 and second region 320, as illustrated in FIG. 11A(c), while moving the diagram 221 from the second region 320 to the first region 310, the controller 180 may change a visual appearance of the diagram 221 (refer to reference numeral 221' of FIG. 11A(c)). This may represent a case where detailed information, summary information, or preview information corresponding to the diagram 221 (representing an information item (or object)) is displayed via a preview screen.

As a third example, when the diagram 221 is located at a boundary area between the first region 310 and second region 320 as illustrated in FIG. 11A(d) while moving the diagram 221 from the second region 320 to the first region 310, the controller 180 may display the diagram 221 as a three-dimensional stereoscopic image using a three-dimensional depth value other than "0" (refer to reference numeral 221' of FIG. 11A(d)).

Figure 11B:
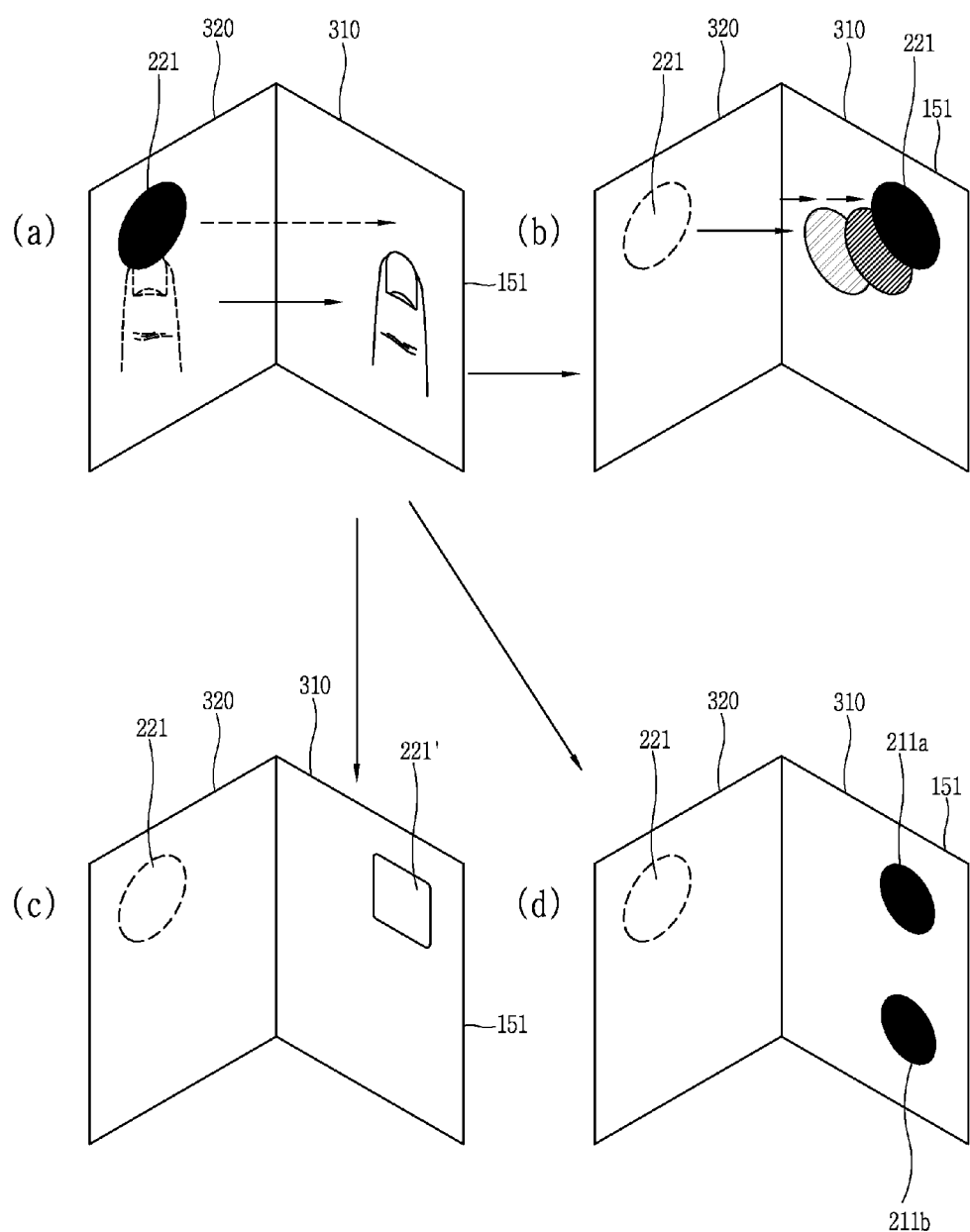

As a fourth example, when the diagram 221 is moved from the second region 320 to the first region 310, the controller 180 may display a visible trace of the movement of the diagram 221 as it is being moved based on a touch input for moving the diagram 221, as illustrated in FIGS. 11B(a) and 11B(b).

As a fifth example, when the diagram 221 is moved from the second region 320 to the first region 310, the controller 180 may change a shape of the diagram 221' when it is displayed on the first region 310 based on a touch input as illustrated in FIG. 11B(c). Consider a case where an information item (or object) contained in the first region 310 is displayed using its associated file name instead of an icon or representative image as it was previously displayed on the second region 320. This case may be similar to the configuration previously discussed as illustrated in FIG. 5B.

As a sixth example, when the diagram 221 is moved from the second region 320 to the first region 310, the controller 180 may display a plurality of diagrams 211a, 211b displayed in the first region 310 as illustrated in FIG. 11B(d). This may represent a case where the diagram 221 is a folder (or group) containing a plurality of data items (or objects) which are displayed when the diagram 221 is moved to the first region 310.

Figure 12A:
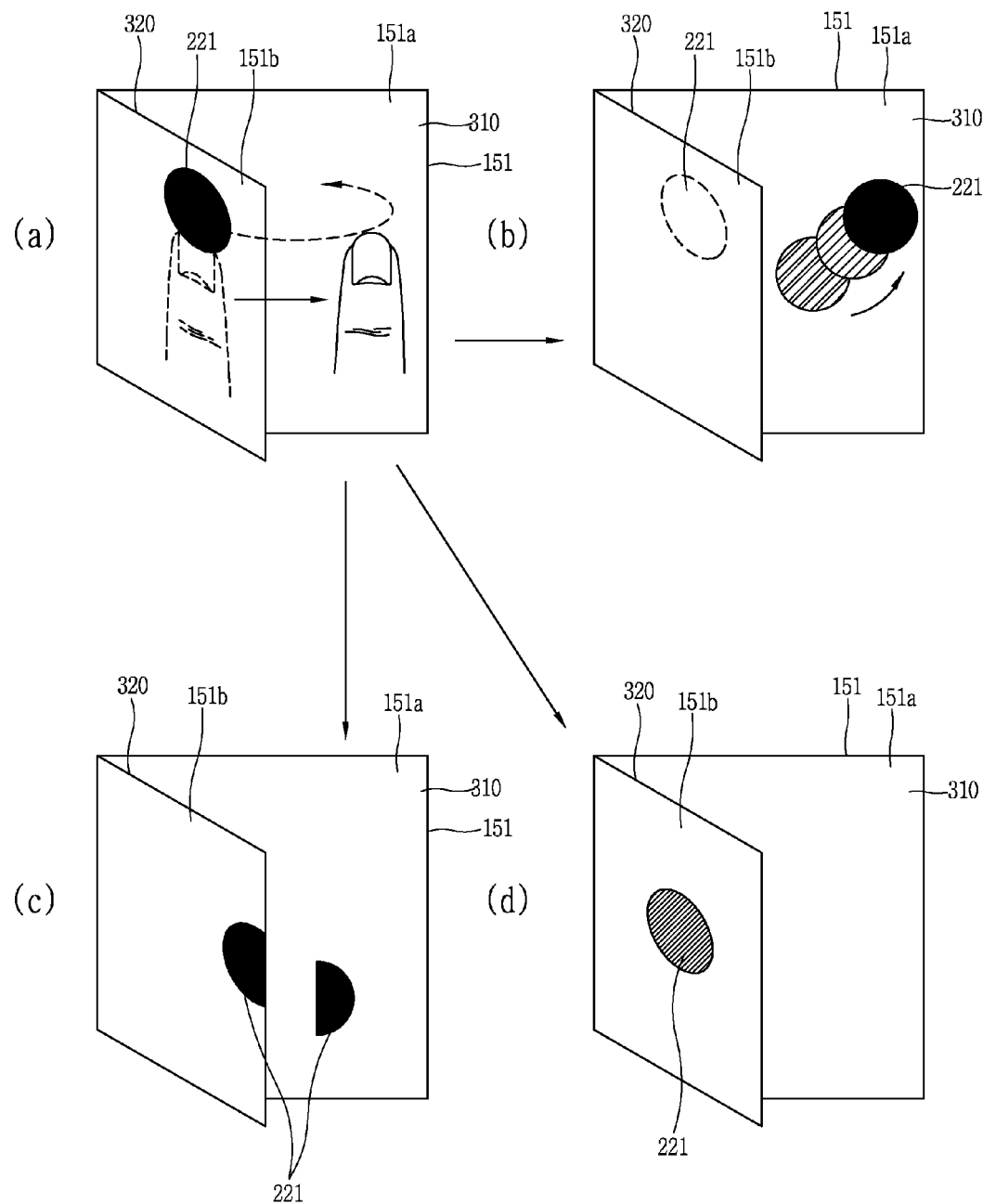

The flexible display unit may include a first display unit 151a and a second display unit 151b as illustrated in FIG. 12A. When an angle of a flexure of the flexible display unit 151 is sensed to be equal to or less than a preset threshold angle, such as 90 degrees as illustrated in FIGS. 12A(a) to 12A(d), the controller 180 may use one region of the second display unit 151b as a second region 320, as illustrated in FIG. 12A(a). Furthermore, the controller 180 may display a diagram 221 displayed on the second region 320 of the second display unit 151b in a highlight mode.

When the diagram 221 is moved from the second display unit 151b containing the second region 320 to the first display unit 151a containing the first region 310 based on a touch input as illustrated in FIG. 12A(b), the controller 180 may control the flexible display unit 151 to visually display a bouncing effect in which the diagram 221 drops (or falls down) to the first display unit 151a.

As illustrated in FIG. 12A(c), the controller 180 may control the flexible display unit 151 such that a diagram 221 displayed on the second display unit 151b gradually disappears from the second display unit 151b as the diagram 221 is moved from the second display unit 151b containing the second region 320 to the first display unit 151a containing the first region 310 based on a touch input. As the diagram 221 disappears from the second display unit, 151b, the diagram 221 may gradually appear on the first display unit 151a, as illustrated in FIG. 12A(c).

As illustrated in FIG. 12A(d), the controller 180 may control the flexible display unit 151 such that a diagram 221 displayed on the second display unit 151b gradually disappears as the diagram 221 is moved from the second display unit 151b containing the second region 320 to the first display unit 151a containing the first region 310 based on a touch input.

Figure 12B:
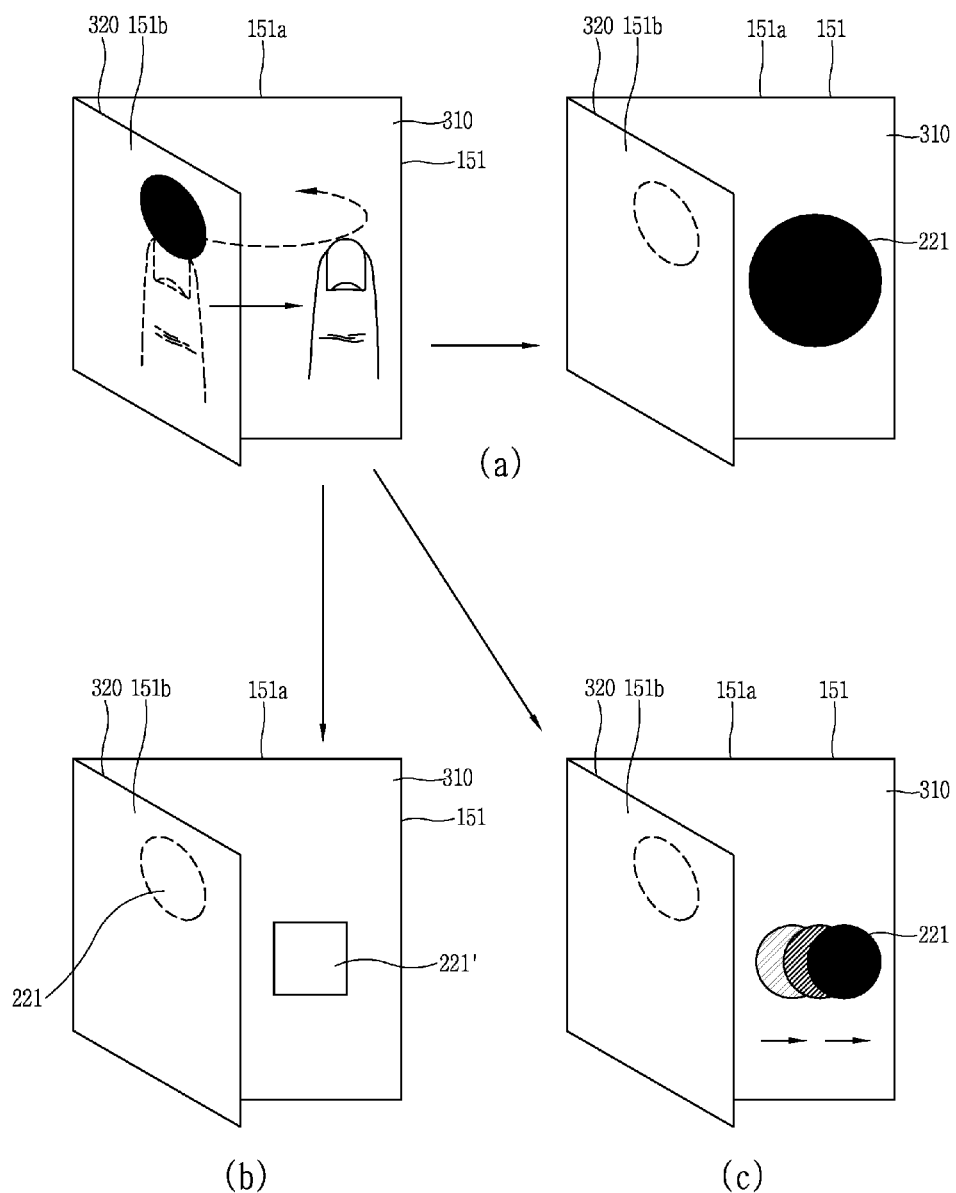

As illustrated in FIG. 12B(a), when the diagram 221 is moved from the second display unit 151b containing the second region 320 to the first display unit 151a containing the first region 310 based on a touch input, the controller 180 may temporarily enlarge and display the diagram 221.

As illustrated in FIG. 12B(b), when the diagram 221 is moved from the second display unit 151b containing the second region 320 to the first display unit 151a containing the first region 310 based on a touch input, the controller 180 may change a shape of the diagram 221 when it is displayed on the first region 310. This case may be similar to the configuration previously discussed as illustrated in FIG. 5B.

As illustrated in FIG. 12B(c), when the diagram 221 is moved from the second display unit 151b containing the second region 320 to the first display unit 151a containing the first region 310 based on a touch input, the controller 180 may display a visible trace of a movement of the diagram 221 as it is moved via a touch input for moving the diagram 221.

As described above, in a mobile terminal according to the present disclosure, when an information (or data) item (or object) is moved to a different region based on a touch input, the controller may display the information item in highlight mode, thereby informing the user that the information item is being moved.

A mobile terminal 100 in accordance with the present invention, and a related control method thereof facilitates displaying information by using the attributes of a flexure of a flexible display unit. Accordingly, a user may easily display associated information by applying a physical force to the mobile terminal without applying a touch input to the flexible display unit.

The method may be implemented as codes readable by a processor on a medium written with the program. The examples of the processor-readable media may include ROM, RAM, CD-ROM, magnetic tape, floppy disk, and optical data storage device, and the like, and also include a device implemented via a carrier wave (for example, transmission via the Internet).

The description of the present invention is intended to be illustrative, and not to limit the scope of the claims. Many alternatives, modifications, and variations will be apparent to those skilled in the art. Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A mobile terminal, comprising:
    a flexible display unit comprising at least one flexible display configured to display information;
    a sensing unit configured to sense at least one flexure of the flexible display unit; and
    a controller configured to:
        divide the at least one flexible display into a first region and a second region at a boundary defined by a location of the at least one flexure in response to the at least one flexure; and
        cause the flexible display unit to display first screen information on the first region and second screen information on the second region, wherein the second screen information is associated with the first screen information and the second screen information includes a plurality of second screen information items, and cause the flexible display unit to display a preview screen of at least one second screen information item of the plurality of second screen information items when the at least one second screen information item is moved within a predetermined threshold distance from the boundary.

2. The mobile terminal of claim 1, wherein the controller is further configured to no longer divide the at least one flexible display into the first region and second region, and control the flexible display unit to no longer display the second screen information in response to the sensing unit no longer sensing the at least one flexure.

3. The mobile terminal of claim 1, wherein:
the flexible display unit is further configured to receive touch inputs; and
the controller is further configured to cause the flexible display unit to display updated second screen information on the second region in response to a change in the first screen information on the first region, wherein the change in the first screen information is in response to a touch input received on the first region.

4. The mobile terminal of claim 1, wherein the controller is further configured to cause the flexible display unit to change the visual appearance of the at least one second screen information item when the at least one second screen information item is moved from the second region to the first region.

5. The mobile terminal of claim 1, wherein:
the flexible display unit is further configured to display information in a three-dimensional stereoscopic mode; and
the controller is further configured to cause the flexible display unit to display the preview screen of the at least one second screen information item with a three-dimensional depth value other than "0".

6. The mobile terminal of claim 5, wherein the controller is further configured to cause the flexible display unit to display the preview screen with a three-dimensional depth value based on a direction in which the at least one flexure of the flexible display unit is sensed by the sensing unit.

7. The mobile terminal of claim 1, wherein the controller is further configured to cause the flexible display unit to display a detailed information screen of the at least one second screen information item when the at least one second screen information item is moved from the second region to the first region.

8. The mobile terminal of claim 1, wherein the controller is further configured to cause the flexible display unit to change the visual appearance of the at least one second screen information item by displaying the at least one second screen information item in a highlight mode.

9. The mobile terminal of claim 8, wherein:
the flexible display unit is further configured to display information in a three-dimensional stereoscopic mode; and
the controller is further configured to cause the flexible display unit to change the visual appearance of the at least one second screen information item by displaying the at least one second screen information item with at least one changed visual attribute, the at least one visual attribute including at least a three-dimensional depth value, an enlarged size, or a visual trace of a movement of the at least one second screen information item.

10. The mobile terminal of claim 1, wherein:
the second region includes at least one group item containing the at least one second screen information item; and
the controller is further configured to cause the flexible display unit to display a preview screen of the contents of the at least one group item when the at least one group item is moved within the predetermined threshold distance from the boundary.

11. The mobile terminal of claim 10, wherein:
the at least one second screen information item is selectable from the preview screen of the contents of the at least one group item; and
the controller is further configured to cause the flexible display unit to move the at least one second screen information item from the second region to the first region when the at least one second screen information item is selected from the preview screen.

12. The mobile terminal of claim 11, wherein:
the at least one group item comprises at least one folder;
the at least one second screen information item comprises at least one image file; and
the preview screen comprises at least one thumbnail view of the at least one image file.

13. The mobile terminal of claim 1, wherein the controller is further configured to cause the flexible display unit to display a preview screen of one of the at least one second screen information item on the first region in response to a selection of the one of at least one second screen information item on the second region.

14. The mobile terminal of claim 13, wherein:
the flexible display unit is further configured to receive touch inputs;
the controller is further configured to cause the flexible display unit to display a preview screen of another of the at least one second screen information item in response to a predefined input received in the first region; and
the another of the at least one second screen information item is different than the selected one of the at least one second screen information item.

15. The mobile terminal of claim 13, wherein the controller is further configured to cause the flexible display unit to display the preview screen of the selected one of the at least one second screen information item on the entirety of the at least one flexible display in response to the sensing unit no longer sensing the at least one flexure.

16. The mobile terminal of claim 1, wherein the controller is further configured to cause the flexible display unit to change the second screen information displayed in the second region based on an attribute of the at least one flexure, the attribute related to at least a number, a strength, a degree, a location, a duration, or a direction of the at least one flexure.

17. A method for controlling a mobile terminal, the method comprising:
displaying first screen information on a flexible display of the mobile terminal;
dividing the flexible display into a first region and a second region in response to at least one flexure of the flexible display, the at least one flexure defining a boundary between the first region and the second region;
displaying the first screen information on the first region and second screen information on the second region, wherein the second screen information is associated with the first screen information and the second screen information includes a plurality of second screen information items; and
displaying on the flexible display a preview screen of at least one second screen information item of the plurality of second screen information items when the at least one second screen information item is moved within a predetermined threshold distance from the boundary.

18. The method of claim 17, further comprising:
no longer dividing the flexible display into a first region and a second region and displaying only the first screen information on the flexible display in response to an absence of the at least one flexure.

* * * * *